United States Patent
He

(10) Patent No.: US 10,455,987 B1
(45) Date of Patent: Oct. 29, 2019

(54) SCALABLE AUTOMATED COOKING SYSTEM HAVING SMALL FOOTPRINT AND REDUCED LABOR COST

(71) Applicant: Zhengxu He, Reno, NV (US)

(72) Inventor: Zhengxu He, Reno, NV (US)

( * ) Notice: Subject to any disclaimer, the term of this patent is extended or adjusted under 35 U.S.C. 154(b) by 719 days.

(21) Appl. No.: 15/157,319

(22) Filed: May 17, 2016

Related U.S. Application Data

(63) Continuation of application No. 13/770,081, filed on Feb. 19, 2013, now abandoned.

(51) Int. Cl.
*A47J 44/00* (2006.01)

(52) U.S. Cl.
CPC ..................... *A47J 44/00* (2013.01)

(58) Field of Classification Search
USPC ..... 414/788.5, 528, 768–770, 283, 359–361; 99/357, 484, 443 C, 443 R
See application file for complete search history.

(56) References Cited

U.S. PATENT DOCUMENTS

| | | | | |
|---|---|---|---|---|
| 1,964,804 A * | 7/1934 | Barnard | ............. | A63H 19/30 246/419 |
| 3,908,531 A * | 9/1975 | Morley | ............. | A47J 37/1219 99/336 |
| 4,270,486 A * | 6/1981 | Leverenz | ............. | A21C 9/04 118/24 |
| 4,503,502 A * | 3/1985 | Chapin | ............. | A47J 27/62 700/90 |
| 4,748,902 A * | 6/1988 | Maurantonio | ...... | A47J 37/1228 99/326 |
| 4,919,950 A * | 4/1990 | Mak | ............. | A47J 27/14 426/233 |
| 5,165,331 A * | 11/1992 | Hayashi | ............. | A21B 7/00 53/260 |
| 5,241,899 A * | 9/1993 | Kuhlman | ............. | A21B 5/06 118/16 |
| 5,782,170 A * | 7/1998 | Pomara, Jr. | ......... | A47J 37/1228 426/438 |
| 6,112,645 A * | 9/2000 | Chang | ............. | A47J 37/1228 99/327 |
| 7,478,749 B2 * | 1/2009 | Clothier | ............. | B65G 54/02 235/383 |
| 7,899,709 B2 * | 3/2011 | Allard | ............. | A47F 10/06 219/388 |
| 8,276,506 B2 * | 10/2012 | Tojo | ............. | B25J 9/0003 99/325 |

(Continued)

*Primary Examiner* — Ibrahime A Abraham
*Assistant Examiner* — John J Norton

(57) ABSTRACT

An automatic cooking system includes a computer system that stores recipes, cooking stations each comprising a cooking container that can cook food ingredients therein to produce a first cooked food, wherein the computer system can assign and schedule a plurality of dishes to be cooked at the cooking stations, storage containers configured to hold food ingredients, mini vehicles each carrying transport containers configured to hold the food ingredients, wherein the computer system can control at least some of movements of the mini vehicles in accordance to the recipes, a loading apparatus configured to load food ingredients from the storage stations to the transport containers on the mini vehicles, and an unloading apparatus that can transfer food ingredients from the transport containers on the mini vehicles to the cooking container at one of the cooking stations.

19 Claims, 38 Drawing Sheets

(56) References Cited

U.S. PATENT DOCUMENTS

2002/0176921 A1* 11/2002 Torghele ................ A21C 1/06
426/549
2015/0013550 A1* 1/2015 Lin ........................ A47F 10/06
99/404

* cited by examiner

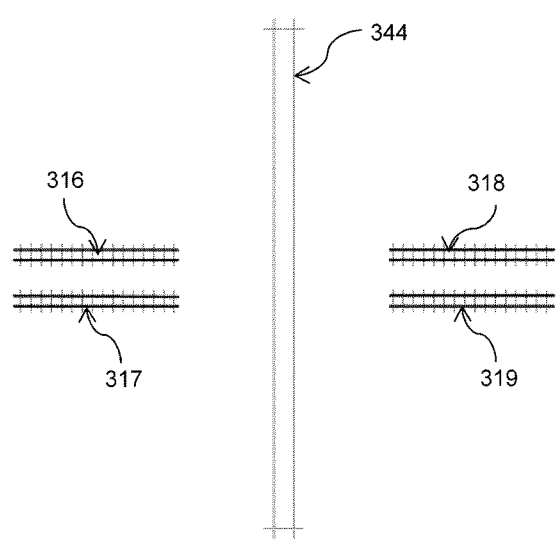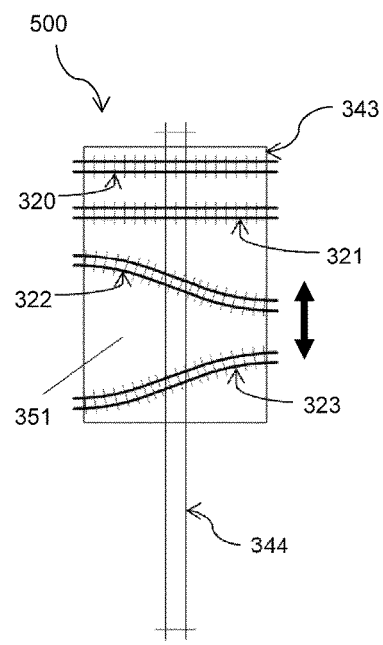
Figure 5D
Figure 5E

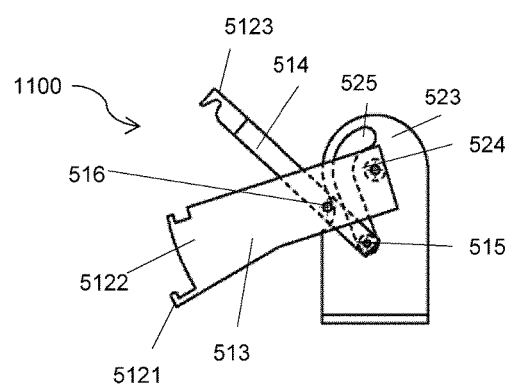 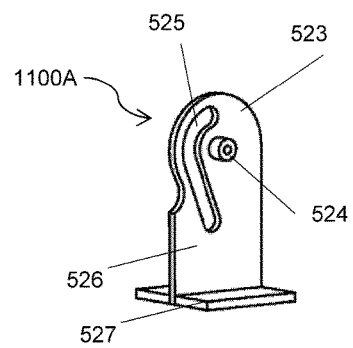
Figure 11A                    Figure 11B

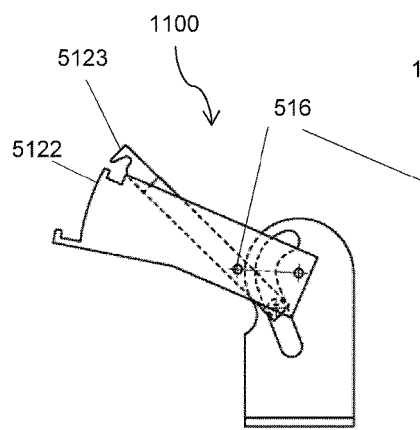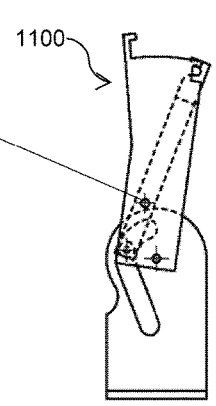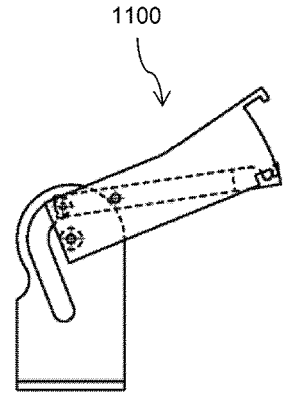
Figure 11D
Figure 11E
Figure 11F

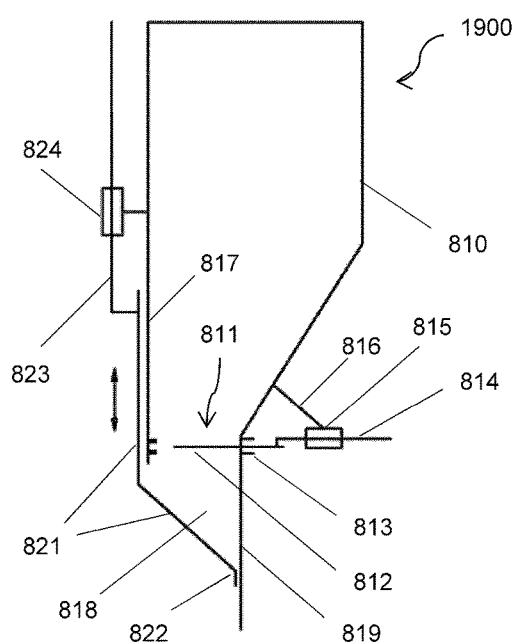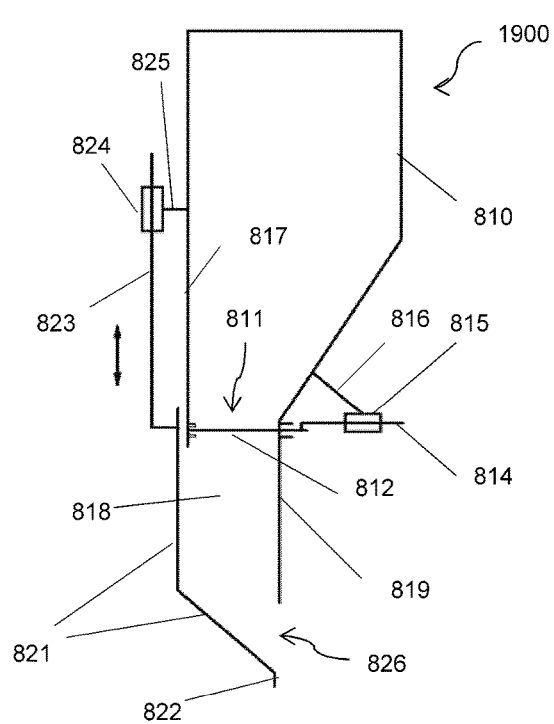
Figure 19A                    Figure 19B

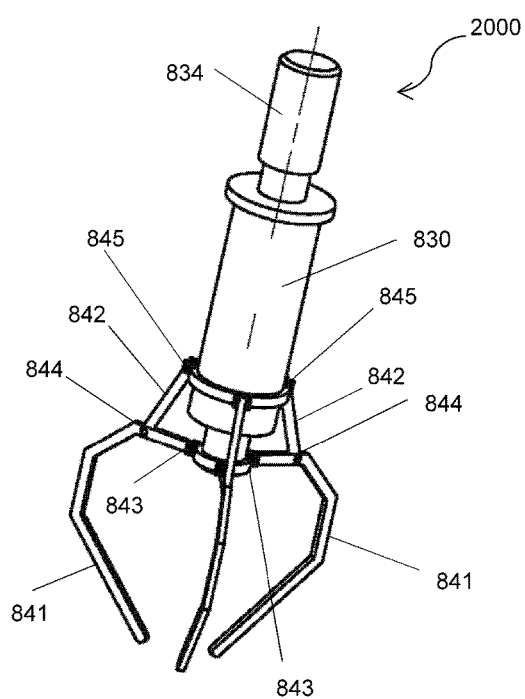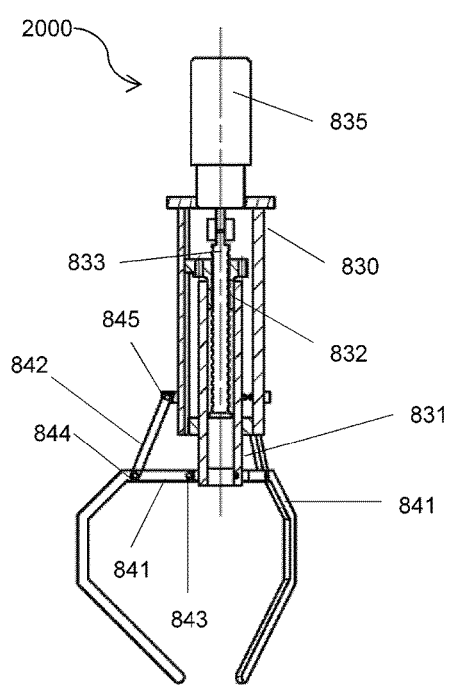
Figure 20A                    Figure 20B

SCALABLE AUTOMATED COOKING SYSTEM HAVING SMALL FOOTPRINT AND REDUCED LABOR COST

This application is a continuation of U.S. application Ser. No. 13/770,081 filed Feb. 19, 2013 entitled "Scalable Automated Cooking System Having Small Footprint and Reduced Labor Cost," the disclosure of which are hereby incorporated herein by reference in their entireties.

CROSS-REFERENCE TO RELATED APPLICATIONS

US Patent Applications:
Ser. No. 13/770,081, Filed: Feb. 19, 2013, Inventor: Zhengxu He
Ser. No. 13/607,712, Filed: Sep. 8, 2012, Inventor: Zhengxu He
Ser. No. 13/490,523, Filed Jun. 7, 2012, Inventor: Zhengxu He

BACKGROUND OF THE INVENTION

The present application relates to cooking system, and specifically to cooking method and equipment capable of automatically delivering food ingredients.

Considerable amount of research and experiments have been conducted on automating cooking. A conventional cook apparatus includes a full set of storage containers positioned above each cooking container. A drawback of conventional cook apparatus is it requires too many storage containers for each cooking container, which takes too much space in a kitchen. For example, a kitchen in a common fast food restaurant may include dozens of storage containers. The problem becomes even worse when there are multiple cooking containers in a kitchen; the kitchen must have large space to host such systems with multi-cooking containers. In addition, subdividing a same ingredient into more than one storage containers disallows sharing by different cooking containers.

U.S. Pat. No. 4,919,950 teaches an automated cooking system comprising a plurality of cooking containers and a conveyor means for moving the cooking containers along a pre-determined path, as to access the dispensers of food ingredients. One disadvantage of this approach is that the cooking containers and the devices connected with cooking containers can be big and heavy so moving these can require a lot of space and a lot of power. Also, if the heaters are connected with the cooking containers, then moving the heaters together can create a fire hazard. Moreover, the technique works best only if all food ingredients may be ordered along the "pre-determined path", so that the order of their dispensing into the cooking container may not be different for different dishes in the menu. Even with this restriction satisfied, there are times when a cooking container may have to idled as to wait for another cooking container for the dispensing of food ingredients.

There is therefore a need for an automated cooking system that provides efficient storage of food ingredients and a dependable delivery of food ingredients from storage to the cooking containers while minimizing space required, minimizing idle time of the cooking apparatus, and reducing labor cost.

SUMMARY OF THE INVENTION

The presently disclosed automated cooking system is capable of automatically delivering multiple food ingredients to cooking containers during cooking. Some food ingredients are transported to cooking apparatus using transport containers, without moving the cooking apparatus to near storage containers, and without having a full set of stationary storage containers (or dispensers of food ingredients) positioned above cooking apparatus in conventional cooking systems. The deliveries of food ingredients to the cooking apparatus can be scheduled according to requirements of cooking recipes. The disclosed cooking system is flexible to the types of food ingredients, suitable for simple or complex recipes. The disclosed cooking system can reduce food print and space requirement in a kitchen, and reduce labor cost. The space and labor savings are especially significant for kitchens comprising a plurality of cooking apparatus because the food storage can be shared among the cooking apparatus. The disclosed systems and methods are thus especially beneficial to large scale kitchen operations in restaurants, cafeteria for colleges or companies, etc.

In one general aspect, the present invention relates to an automated cooking system, comprising: a computer system that can store a list of recipes; one or more cooking stations each comprising a cooking container that can cook food ingredients therein to produce a first cooked food, wherein the computer system can assign and schedule a plurality of dishes to be cooked at the one or more cooking stations; one or more storage containers that can hold food ingredients; one or more mini vehicles each carrying one or more transport containers that can hold the food ingredients, wherein the computer system can control at least some of movements of the mini vehicles in accordance to the recipes; a loading apparatus that can load food ingredients from the one or more storage stations to the transport containers on the one or more mini vehicles, wherein the computer system can control loading of food ingredients from the one or more storage stations to the transport containers on the one or more mini vehicles based on the recipes; and an unloading apparatus that can transfer food ingredients from the transport containers on the one or more mini vehicles to the cooking container at one of the one or more cooking stations, wherein the computer system can control transfers of the food ingredients from the transport containers on the one or more mini vehicles to the one or more cooking apparatus in accordance to the recipes.

Implementations of the system may include one or more of the following. The automatic cooking system further includes a cleaning apparatus that can clean the one or more transport containers on the one or more mini vehicles, wherein the computer system controls timing when the cleaning apparatus to clean the one or more transport containers. The computer system can control times for the food ingredients to be transferred to the one or more cooking apparatus in accordance to the recipes. The computer system can control the one or more mini vehicles using wireless communications. At least one of the one or more mini vehicles can carry a plurality of transport containers that each can hold food ingredients, wherein the computer system can control the one of the one or more mini vehicles to stop at two or more positions adjacent to the one or more storage containers to load food ingredients. The one or more cooking stations can include a first cooking station that can cook part or all of the food ingredients in a recipe to produce semi-cooked food, wherein the one or more cooking stations comprises a second cooking station that can cook the semi-cooked food to produce a second cooked food, wherein the semi-cooked food is transferred from the first cooking station to the first cooking station under the control of the computer system. The automatic cooking system can further include sensors that can detect positions of the one or more vehicles and send associated signals to the computer system, wherein the computer system can determine positions of the one or more vehicles based on the signals. The sensors can include RFID or vision sensors. The automatic cooking system can further include a food preparation apparatus that can conduct one or more of operations to the food ingredient before transferred to the cooking containers for cooking: cleaning, cutting, grinding, blending, or mixing the food ingredient. The automatic cooking system can further include one or more rail tracks that can connect the one or more cooking apparatus and the one or more storage stations, wherein the one or more mini vehicles that can move along the one or more rail tracks, wherein the computer system can control the movements of the one or more mini vehicles along the one or more rail tracks in accordance to the recipe. The one or more rail tracks comprise two rails or a mono rail. The one or more mini vehicles can be positioned on the one or more rail tracks or hanging off the one or more rail tracks. The one or more mini vehicles can be driven by gravity along at least a portion of the one or more rail tracks. The automatic cooking system can further include a track switch in association with two or more of the rail tracks, wherein the computer system can control the track switch to direct the one or more mini vehicles to different route along the one or more rail tracks. The track switch can include a frame; two or more connection tracks that can be mounted on the said frame; and a movement mechanism that can slide or rotate the said frame among two or more positions. The computer system can track type and quantities of food ingredients in the one or more storage containers, the one or more transport containers, and the cooking containers at the one or more cooking stations.

In another general aspect, the present invention relates to an automatic cooking system that includes a computer system that can store a recipe; one or more cooking stations each comprising a cooking container that can cook food ingredients therein to produce a first cooked food, wherein the computer system can assign and schedule a plurality of dishes to be cooked at the one or more cooking stations; one or more storage containers that can hold food ingredients; one or more transport containers that can hold the food ingredients, wherein the computer system can control at least some of movements of the one or more transport containers in accordance to the recipe; a loading apparatus that can load food ingredients from the one or more storage stations to the transport containers, wherein the computer system can control loading of food ingredients from the one or more storage stations to the transport containers based on the recipe; and an unloading apparatus that can transfer food ingredients from the transport containers to the cooking container at one of the one or more cooking stations, wherein the computer system can control transfers of the food ingredients from the transport containers to the one or more cooking apparatus in accordance to the recipe.

Implementations of the system may include one or more of the following. The loading apparatus and the unloading apparatus can include one or more of a tunnel, a funnel, a clipping device, a robotic arm, or a grabbing device. The loading apparatus can include a first object mounted below a storage container that can enclose a space that can receive the food ingredients contained from the storage container; and a second object that can slide in the first object, under the control of the computer system, which adjusts volume of the space and transfers at least a portion of the food ingredients to the cooking container. The one or more cooking stations can include a first cooking station that can cook part or all of the food ingredients in a recipe to produce semi-cooked food, wherein the one or more cooking stations comprises a second cooking station that can cook the semi-cooked food to produce a second cooked food, wherein the semi-cooked food is transferred from the first cooking station to the first cooking station under the control of the computer system. At least one of the food ingredients can be a liquid, the automatic cooking system can further include a liquid dispensing device, wherein the computer system can control the a liquid dispensing device to transfer the liquid from the plurality of storage containers to the cooking container based on the recipes. The computer system can control the liquid dispensing device to control start, stop, and duration of transfer of the liquid from the plurality of storage containers to the cooking container based on the recipe. The loading mechanism can include a liquid metering device in communication with the computer system and configured to measure amount of a food ingredient transferred from the plurality of storage containers to the cooking container; wherein the computer system can control the liquid dispensing device in response to a signal received from the liquid metering device. The liquid dispensing device can include a syringe tube and a syringe plunger contained therein configured to pump the liquid to deliver the liquid to the cooking container under the control of the computer system.

These and other aspects, their implementations and other features are described in detail in the drawings, the description and the claims.

BRIEF DESCRIPTION OF THE DRAWINGS

FIGS. 5A-5E illustrate other implementations of track switching in a network of rail tracks compatible with the automated cooking system in accordance with the present invention.

FIGS. 8-9B illustrate details of an exemplified rail track compatible with the automated cooking system in accordance with the present invention.

FIGS. 11A-11F illustrate an exemplified unloading mechanism for a transport container on a mini vehicle compatible with the automated cooking system in accordance with the present invention.

FIGS. 16A-16C, 17A-17D, 18A-18D, and 19A-19B respectively illustrate other exemplified storage and loading apparatus compatible with the automated cooking system in accordance with the present invention.

FIGS. 20A-20B illustrate an exemplified clipping apparatus compatible with the automated cooking system in accordance with the present invention.

DETAILED DESCRIPTION OF THE INVENTION

Figure 1:
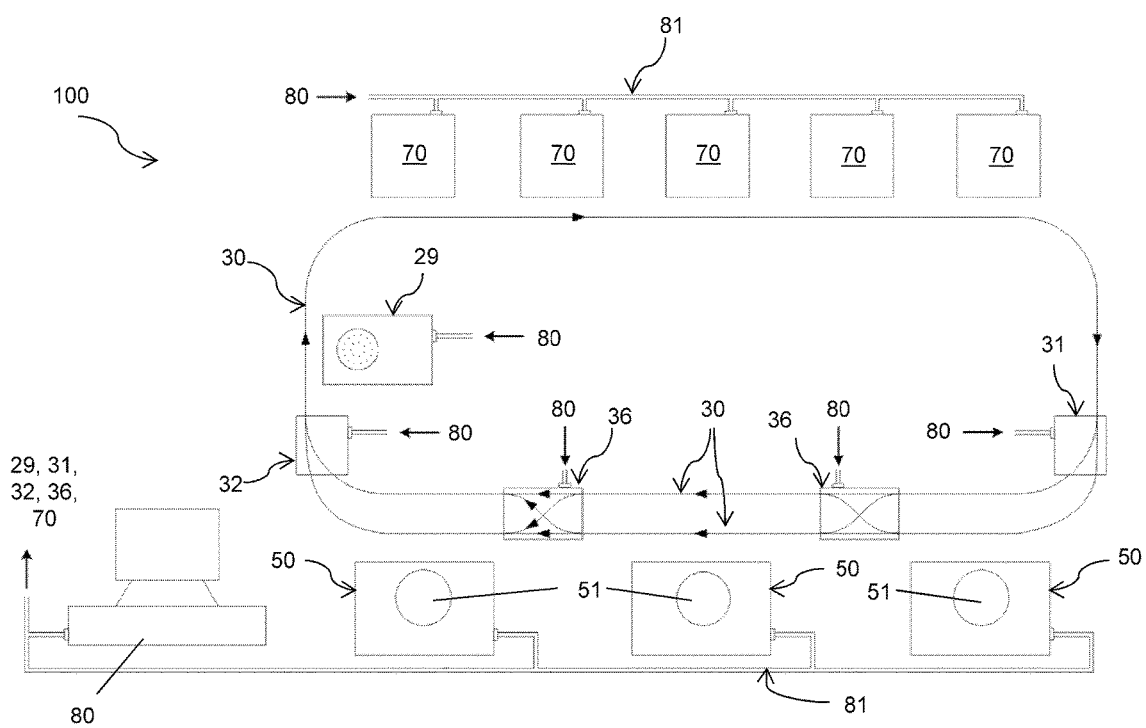
FIG. 1 is a schematic view of an implementation automated cooking system in accordance with the present invention.

In some embodiments, referring to FIG. 1, an automated cooking system 100 includes cooking stations 50, storage stations 70, a cleaning station 29. A network of rail tracks 30 links the storage stations 70, the cooking stations 50 and the cleaning station 29. The rail tracks 30 includes split track switch (i.e., one-to-two track switch) 31, a merging track switch (i.e., two-to-one track switch) 32, and two-to-two track switches 36. A multiple of mini vehicles (not shown in FIG. 1) can move on the rail tracks 30. Each mini vehicle carries one or more transport containers configured to hold food ingredients. Each cooking station 50 includes at least one cooking apparatus with a cooking container 51, and a cart unloading apparatus to transfer food ingredients from transport containers to the cooking container (not shown in FIG. 1).

In the present disclosure, the term "cooking apparatus" refers to the subsystem in the cooking system that is responsible for heating, stirring, flipping, and/or mixing the food ingredients to produce the dish and for transferring cooked food into some holders of cooked food. The term "cooking system" refers to overall system that includes the cooking apparatus, storage systems for food ingredients, and transport systems for delivering the food ingredients. It should also be noted that the term "rail track" can exist in different configurations suitable for the presently disclosed systems and methods. Examples of rail track include mono rails, two parallel rails, etc. The mini vehicles can travel on top of the rail tracks, or hanging below or on the side of rail tracks. As described below, mechanisms can be configured accordingly for transferring food ingredients into or out of transport containers in the mini vehicles and for transferring cooked food from cooking container to the mini vehicles.

Each storage station 70 includes one or more storage containers of food ingredients and an apparatus to load the food ingredients from the storage containers into the transport containers on the mini vehicles. The cleaning station 29 includes a turning apparatus which turns the transport containers on the mini vehicles, and a controlled apparatus that can spray hot water or steam into the inner surface of the transport containers. A computer 80 can be connected via wires 81 to the cooking stations 50, the storage stations 70, the cleaning station 29, and the track switches 31, 32, and 36. The computer 80 can store a list of recipes, and control the movements and stops of the mini vehicle; operations of the track switches 31, 32 and 36; loading of food ingredients from storage containers to the transport containers on the mini vehicles; quantity of food ingredients loaded from storage containers to transport containers; transferring of food ingredients from transport containers to cooking containers; operation of the cleaning station 29; and operations of the cooking apparatus.

The computer 80 can also control motors to drive the mini vehicles through a one-way (from computer to the mini vehicles) or two-way communications (between the computer and each mini vehicle) through a wired or wireless communication. Here a wireless communication may be established via a radio (e.g., ZigBee), microwave (e.g., Bluetooth, Wi-Fi), light (e.g., infrared), sonic, ultrasonic waves; or via electromagnetic induction short range communication, etc.

An advantage of the disclosed automated cooking system is that the storage stations, the cleaning system, the computer, etc. can be shared among multiple cooking apparatus. In other words, a storage station can supply a common food ingredient to several cooking apparatus. This makes the automated cooking system scalable without having to increasing footprint proportionally as in come conventional systems.

Figure 2:
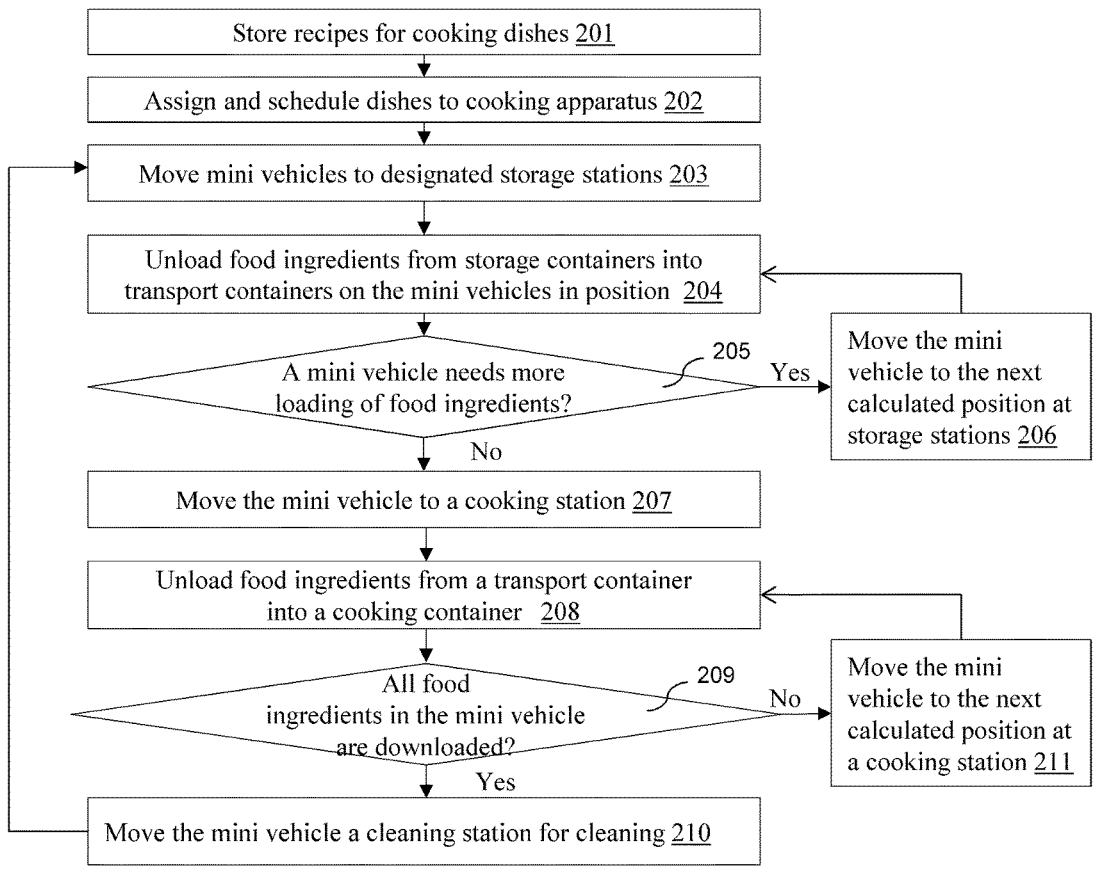
FIG. 2 is a flow chart showing the process of delivering food ingredients in the automated cooking system in accordance with the present invention.

Referring to FIG. 2, the process of the delivery of food ingredients can include one or more of the following steps. A computer stores recipes for cooking dishes in memory (step 201). Upon receiving an order for new dishes, the computer assigns and schedules dishes in the order to be cooked at one or more cooking stations (step 202). Based on the recipes, the computer commands the mini vehicles in waiting to move to some designated positions at the designated storage stations (step 203). Food ingredients are loaded onto the designated transport containers from the designated storage containers (step 204). The amounts of food ingredients loaded are determined by quantities specified in the recipe for the dishes. If a mini vehicle has multiple transport containers (step 205), the mini vehicle can stop at several positions to allow all designated transport containers on the mini vehicle to be loaded with food ingredients (step 206). Then the mini vehicle is sent to a designated position at a designated cooking station (step 207), at which the food ingredients in the transport container is unloaded into the cooking container at a designated time in accordance to the recipe (step 208). If all food ingredients on the mini vehicle are unloaded (step 209), the mini vehicle is sent to a cleaning station which cleans the transport containers (step 210). The cleaning can include spray water or spray steam. Then the mini vehicle is in waiting, to be sent to storage stations again. If the mini vehicle includes multiple loaded transport containers, it can be moved to a new position at a designated cooking station to allow next load of food ingredient to be unloaded into the cooking container (step 211).

The computer may have logistics software that assigns and schedules the dishes in a new order to different cooking apparatus for cooking. Examples of operations controlled by the computer include:
1) start time of a cooking apparatus for cooking each assigned dish;
2) times for unloading of the food ingredients from transport containers to the cooking containers;
3) times for the mini vehicles to arrive at designated positions at the cooking stations;
4) times to loading food ingredients from storage containers to transport containers;
5) times for the mini vehicles to arrive at designated positions at storage stations;
6) times for the mini vehicles to arrive at designated positions at the cleaning station.

The logistics software can store and control the following exemplified operation parameters based on the recipes:
(a) time periods required to load the transport containers;
(b) time periods required to load the quantities of food ingredients from storage containers to the transport containers;
(c) time periods required for a mini vehicle to travel from positions to positions;
(d) time periods for the cooking apparatus for finish cooking an assigned dish;
(e) time periods required to clean the transport containers in a mini vehicle;
(f) time periods required to operate the track switches;
(g) the current status of the devices in the apparatus and the unfinished tasks from the older orders, if any. In addition, any pair of (successive) mini vehicles need to keep a certain distance away from each other, so they do not collide with each other.

The logistics software may need to adjust the start times for cooking the dishes at the cooking apparatus, as to avoid conflicts of different mini vehicles on the rail track. In some cases, a cooking apparatus may have to be idled momentarily, waiting for some designated mini vehicles carrying food ingredients to arrive at unloading positions. Once the cooking at a cooking apparatus is started, the food ingredients should arrive prior to the designated unloading times, as waiting for food ingredients in the middle of cooking may not be allowed. Thus, it is sometimes desirable to have all food ingredients required for a dish to be loaded into the transport containers of a single mini vehicle. Moreover, food ingredients from different storage containers may be loaded into the same transport container if according to the recipe, these food ingredients are to be delivered into the cooking container at the same time.

The assignment of different dishes in a new order to different cooking apparatus, and the adjustment of start times for cooking the dishes may be done by the computer, using an optimization software which helps minimize the total idle time of the cooking apparatus.

Examples of an automated cooking apparatus are disclosed in pending U.S. patent application Ser. Nos. 13/607,712 and 13/490,523, filed by the same inventor, the content of which is incorporated herein by reference.

Figure 3:
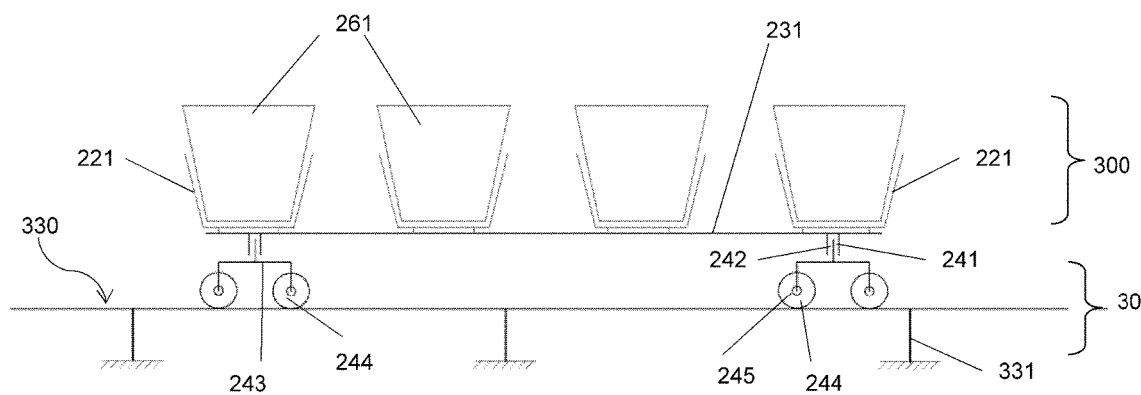
FIG. 3 shows details of a mini vehicle and a rail track compatible with the automated cooking system in accordance with the present invention

In some embodiments, referring to FIG. 3, a mini vehicle 300 includes a main frame 231, two frames 243, and wheels 244 whose shafts are connected to the frames 243 by bearings 245. A motor (not shown in Figure) may drive the rotation of one or more wheels. The wheels 244 are designed to move along a rail track 30 consisting of a pair of rails 330.

The rails 330 are mounted on the support frames 331. The main frame 231 is connected with each of the two frames 243 via a vertical hinge joint consisting of a shaft 242 in a sleeve 241. A multiple of basket shaped holders 221 are fixedly connected atop the main frame 231. Each holder 221 holds a transport container 261 which may contain food ingredients. The transport containers 261 may be lifted up and detached from the basket shaped holders 221.

It should be noted that the transport container 261 may be directly connected with the main frame 231 via a properly positioned hinge joint, so that the transport container may be rotated (by a computer controlled motor) around the hinge joint and be turned as to unload food ingredients container therein. The hinge joint needs to be positioned a proper distance away on a side of the mini vehicle. This may require more space along the rail track for the hinge joint to travel with the mini vehicle.

It should also be noted that the transport containers may also hang onto a frame of a mini vehicle from below, or from a side.

Figure 4A:
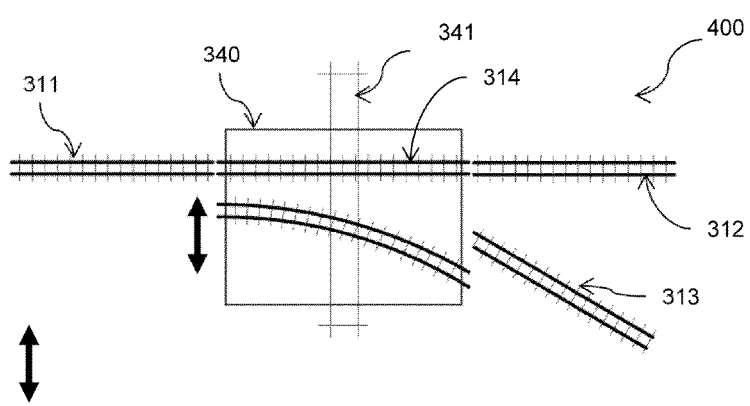
FIGS. 4A-4D illustrate implementations of track switching in a network of rail tracks compatible with the automated cooking system in accordance with the present invention.
Figure 4B:
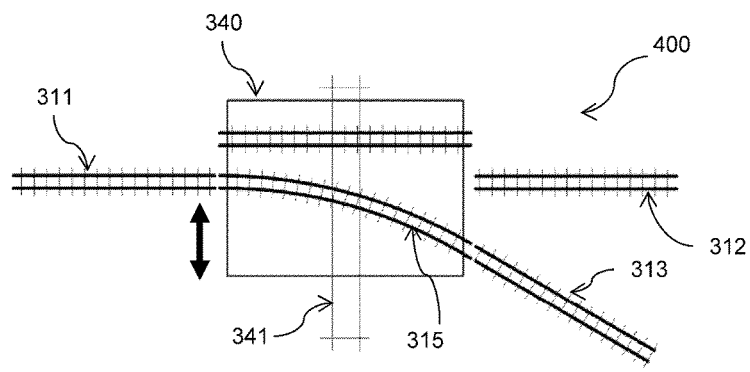
Figure 4C:
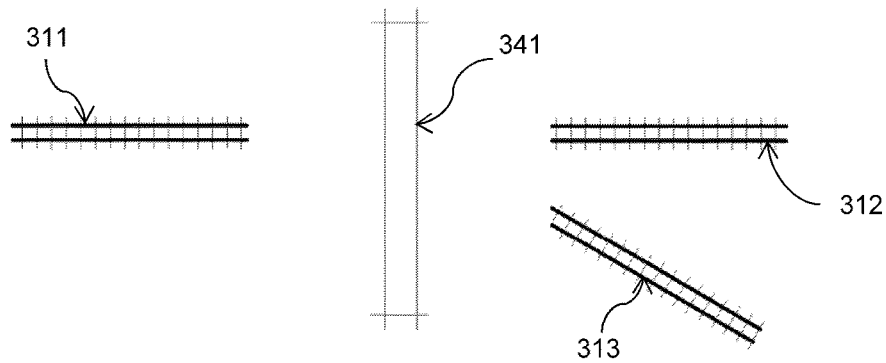
Figure 4D:
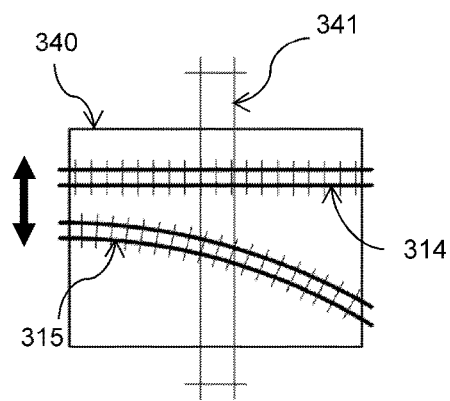

In some embodiments, referring to FIGS. 4A-4D, a track switch 400 includes a rail track 311 on the left, two rail tracks 312 and 313 on the right, and a frame 340 which may slide on a sliding track 341. Each rail track as shown includes a pair of rails, but this is not a requirement. (This also applies to FIGS. 5A-6D.) Two connection rail tracks 314 and 315 are mounted on the frame 340 (FIG. 4D). The frame 340 may slide between two different positions as shown in FIGS. 4A and 4B: in the position as shown in FIG. 4A, the pair of rail tracks 311 and 311 may be connected through the connection rail track 314; in the position as shown in FIG. 4B, the pair of rail tracks 311 and 313 may be connected by the connection rail track 315.

We note that the track switch 400 may be used as a two-to-one track switch if the mini vehicles move from right to left, or as a one-to-two track switch if the mini vehicles move from left to right. A motor (not shown in Figure) may drive the sliding of the frame 340 along the track 341, and a computer (not shown) may control the motor to slide the frame into a designated position at a designated time.

Figure 5A:
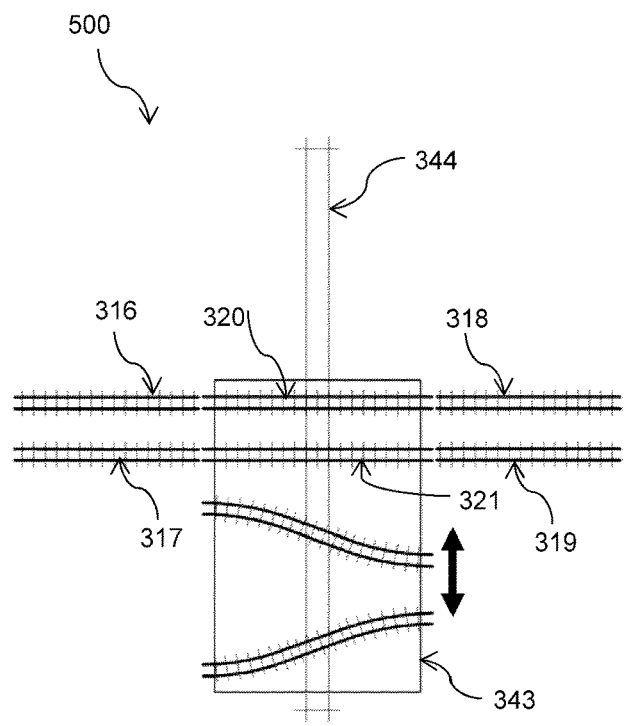
Figure 5B:
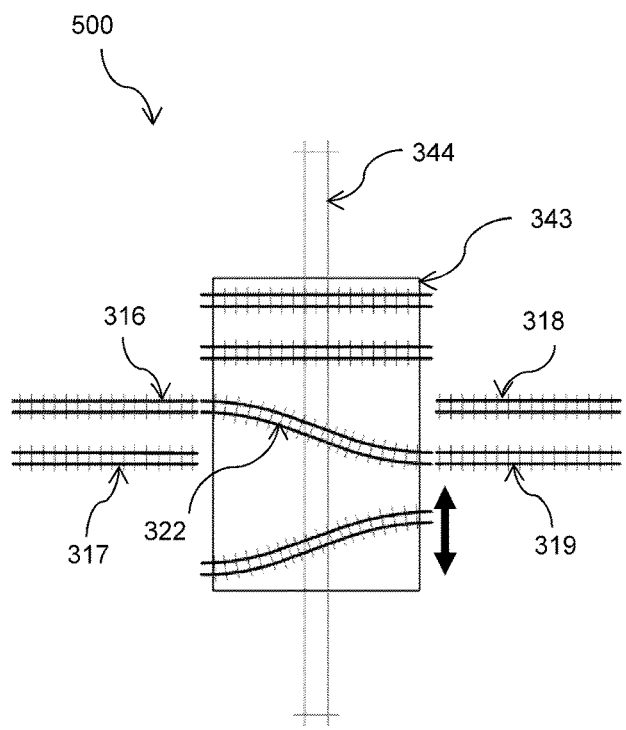
Figure 5C:
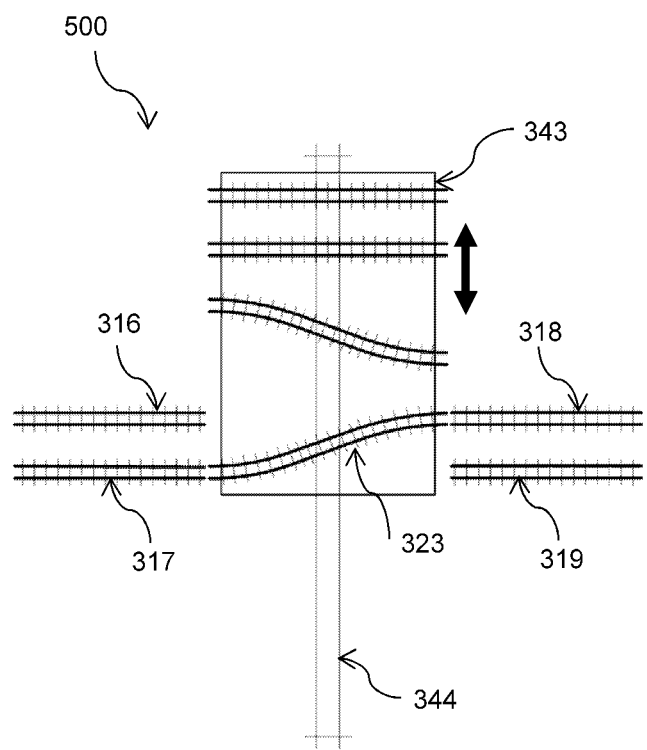

In some embodiments, referring to FIGS. 5A-5E, a two-to-two track switch 500 includes a pair of rail tracks 316 and 317 on the left, a pair of rail tracks 318 and 319 on the right, and a frame 343 which may slide along a sliding track 344. Two connection rail tracks 320 and 321, two curved connection rail tracks 322 and 323 are fixedly installed atop the frame 343 (FIG. 5E). The frame 343 may slide among three different positions as shown in FIGS. 5A-5C: in FIG. 5A, the tracks 316 and 318 are joined by the connection rail track 320 and the tracks 317 and 319 are joined by the connection rail track 321; in FIG. 5B, the tracks 316 and 319 are joined by the connection rail track 322; and in FIG. 5C, the tracks 317 and 318 are joined by the connection rail track 323. A motor (not shown in Figure) may drive the sliding of the frame 343 along 344, and a computer (not shown) may control the motor as to slide the frame into a designated position at a designated time.

The rails tracks 316, 317, 318, 319, 320 and 321 as shown in FIGS. 5A-5E can be substantially parallel to each other, but this is not a requirement.

Figure 6A:
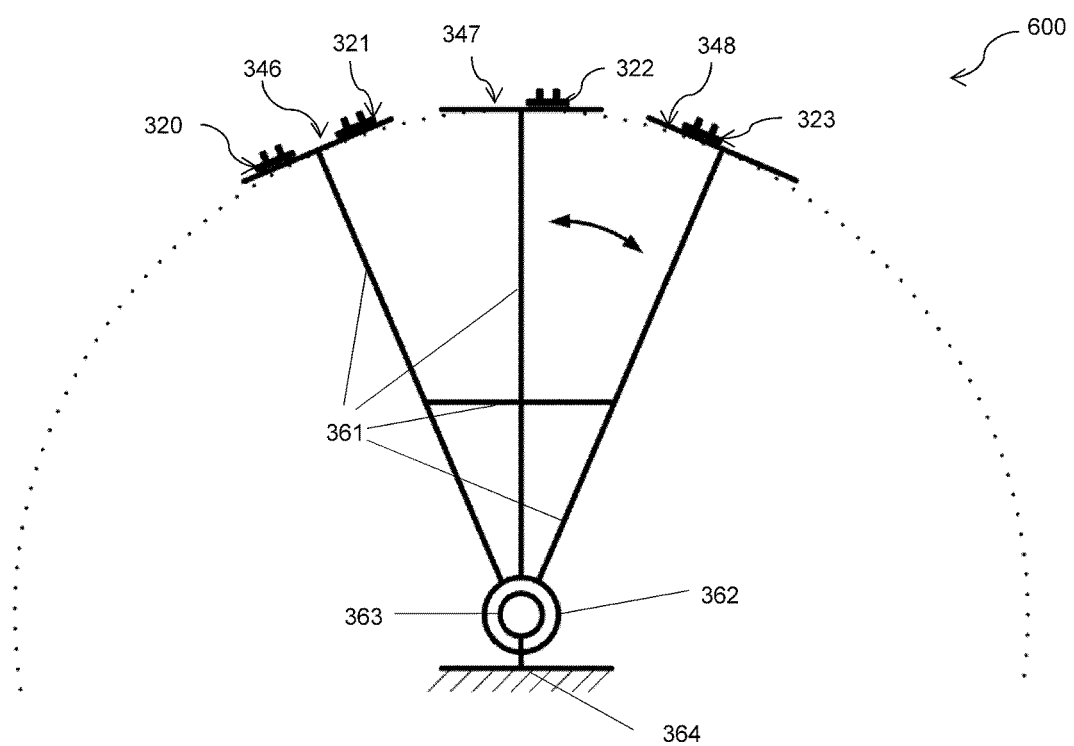
FIGS. 6A-6D illustrate other implementations of track switching in a network of rail tracks compatible with the automated cooking system in accordance with the present invention.
Figure 6B:
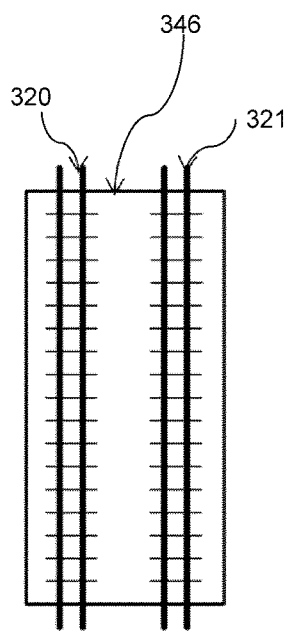
Figure 6C:
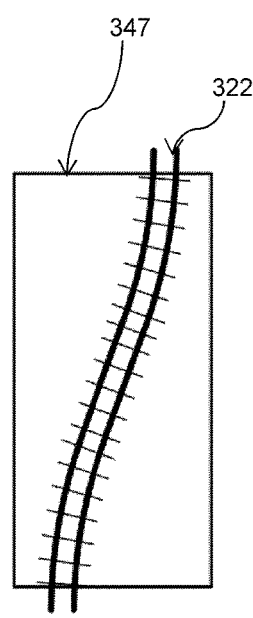
Figure 6D:
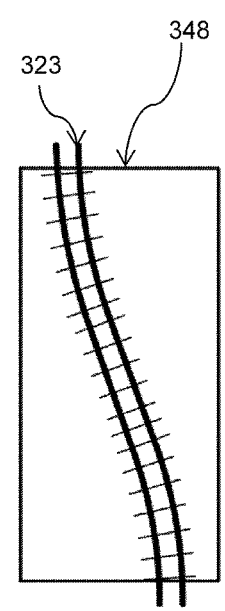

In some embodiments, referring to FIGS. 6A-6D, a two-to-two track switch 600 has a similar function as the track switch 500 and has a rotational mechanism replacing the sliding mechanism A main frame 361 is fixedly connected to the sleeve 362 of a shaft 363; and the shaft 362 is fixedly joined with a support frame 364. Three frames 346, 347 and 348 are fixedly connected to the main frame 361. Two connection rail tracks 320 and 321 are fixedly installed on the frame 346 (FIG. 6B). A curved connection rail track 322 is fixedly installed on the frame 347 (FIG. 6C). A curved connection rail track 323 is fixedly installed on the frame 348 (FIG. 6D). The three mutually rigidly connected frames 346, 247, 348 may rotate simultaneously around the shaft 363. At a certain first angle, the connection rail tracks 320 and 321 on the frame 346 join the tracks 316 and 318, and respectively the tracks 317 and 319, similarly as in FIG. 5A. At a certain second angle, the connection rail track 322 on the frame 347 joins the rail tracks 316 and 319 similarly as in FIG. 5B. At a certain third angle frame, the connection rail track 323 on the frame 346 joins the rail tracks 317 and 318 similarly as in FIG. 5C. A motor (not shown) may drive the rotation of the sleeve 362 around the shaft 363, and a computer (not shown) may control the motor as to rotate the sleeve into a designated position at a designated time.

Figure 7:
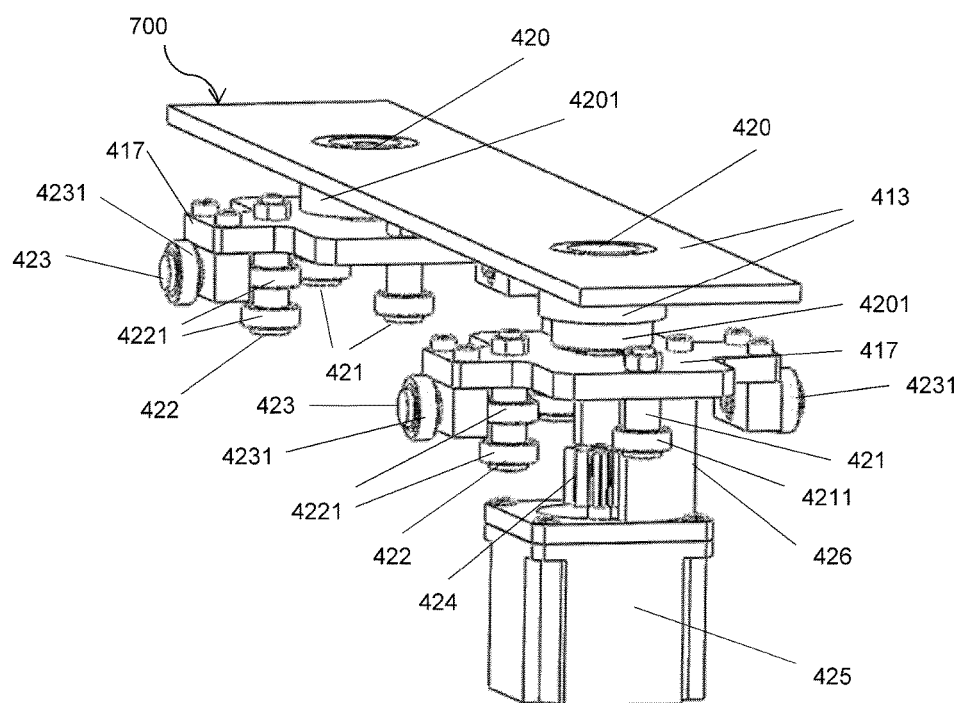
FIG. 7 illustrates an implementation of a mini vehicle suitable for transporting food ingredients in the automated cooking system in accordance with the present invention.

In an exemplified implementation, referring to FIG. 7, a mini vehicle 700 includes a main frame 413 and two frames 417 each of which is joined with the main frame 413 via a hinge joint consisting of a shaft 420 in a sleeve 4201; where the sleeves 4201 are rigidly connected with the main frame 413 and each shaft 420 is rigidly connected with the respective frame 417. Two vertical shafts 421 and a vertical shaft 422 are rigidly mounted below each frame 417; and two horizontal shafts 423 are rigidly mounted each frame 417, one on either side. A wheel 4211 is mounted on each shaft 421 with ball bearings (hidden in the Figure) installed between the shaft 421 and the corresponding wheel 4211. Two wheels 4221 are mounted on each shaft 422, with ball bearings installed between the shaft 422 and the corresponding wheels 4221. A wheel 4231 is mounted on each shaft 423, with ball bearings installed between the shaft 423 and the corresponding wheel 4231. A connector 426 rigidly connects the frame of a motor 425 with one of the frames 417; and a gear 424 is mounted on the shaft of the motor 425. The axis of the gear 424 is the same as the axis of the shaft of the motor 425, and it is vertical. Holders of transport containers (not in Figure) may be mounted atop the main frame 413.

Figure 8:
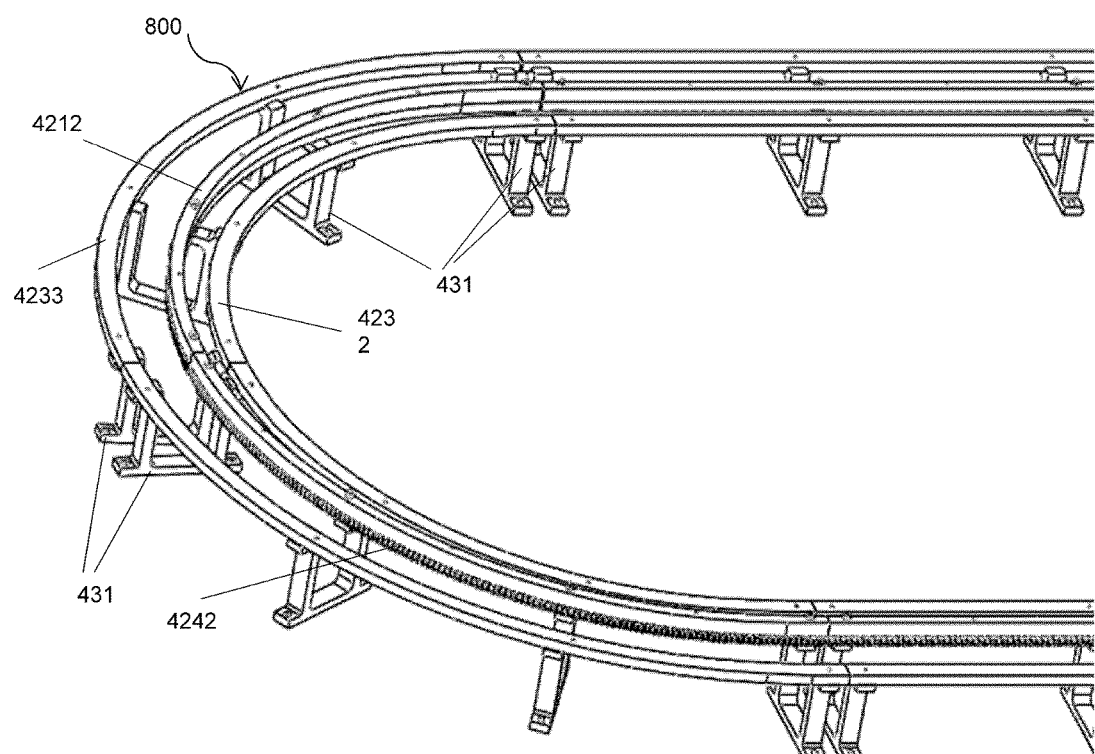
Figures 9A, 9B:
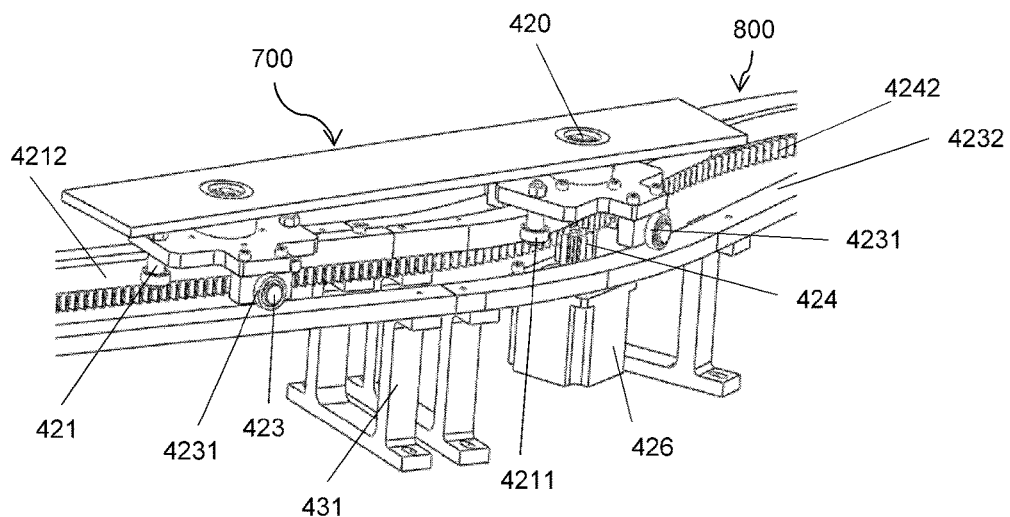

In some embodiments, referring to FIG. 8, a rail track 800 includes a rail 4212 at the center, two rails 4232 and 4233 on either side, and a gear track 4242 below the rail 4212. The rails 4212, 4232, 4233 and the gear track 4242 are fixedly mounted on a multitude of support frames 431. Both vertical sides of the rail 4212 are smooth. The mini vehicle 700 may travel on the rail track 800 as in FIGS. 9A-9B: The wheels 4211 of the mini vehicle 700 touch a vertical side of the rail 4212, and the wheels 4221 touch the other vertical side of the rail 4212. The gear 424 is engaged with the gear track 4242. The wheels 4231 of the mini vehicle 700 touch the top surfaces of the rails 4232 and 4233. The motor 426 drives the rotation of the gear 424, hence moving the mini vehicle 700 along the track 800. A computer (not in Figure) may control the direction and speed of movements and breaking (stops) of the motor 426, as to move the mini vehicle to the designated points at designated times. An encoder may be installed to measure a cumulative angle of rotations in the gear 424, and the information of the encoder may be sent to a computer to determine the position of the mini vehicle. The gear 424 instead of a usual wheel helps with more precise positioning of the mini vehicle.

Figure 10A:
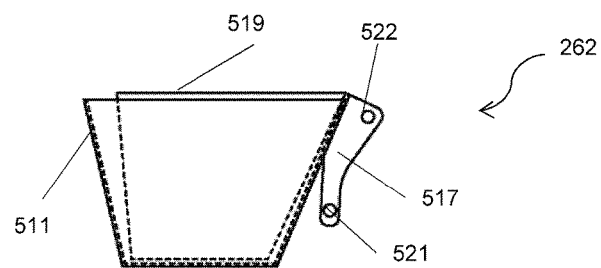
FIGS. 10A-10B illustrate an exemplified transport container compatible with the automated cooking system in accordance with the present invention.
Figure 10B:
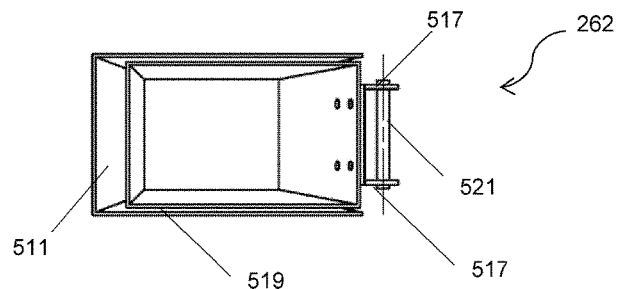

In some embodiments, referring to FIGS. 10A-10B, a transport container 262 consists of a frame 511 and a box 519 that may hold food ingredients. The box 519 is fixedly or elastically attached to the frame 511. Food ingredients may drop to the box 519 from above. Two holders 517 are attached to the frame 511 from a side; and two bars 521 and 522 are mounted on the holders 517. It should be noted that the frame 511 and the box 519 can be made as a unitary piece. It should also be noted that the inner surface of the box 511 can be made textured or rugged, or be covered by a net, so that the food ingredients contained therein are less sticky to the inner surface of the box.

Figure 11C:
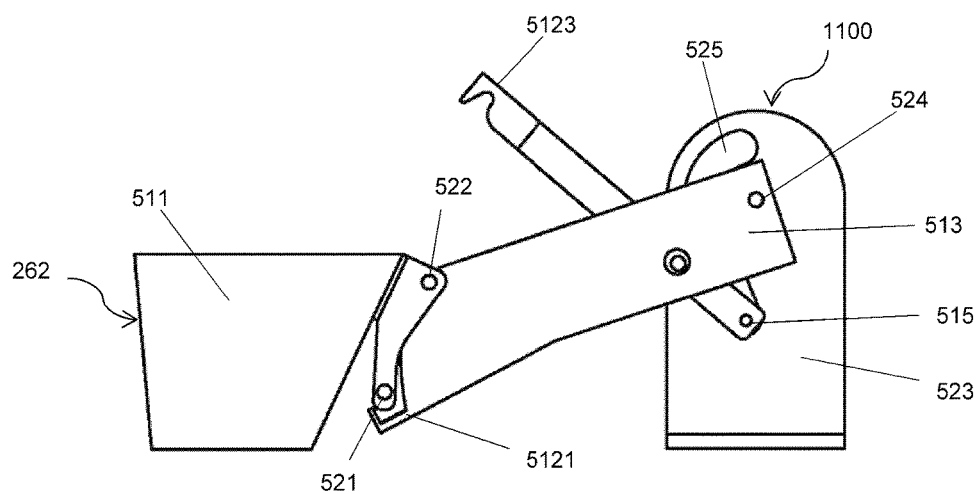

In some embodiments, referring to FIGS. 11A-11D, a cart turning apparatus 1100 consists of a base apparatus 1100A (in FIG. 11B) with a hinge joint 524, and a connector 513 which is connected to the base apparatus 1100A via the hinge joint 524. The base apparatus 1100A consists of a flat board 523 of some thickness that is mounted on a support frame 527; and a curved strip 525 is carved from the board 523, so that a wheel can fit inside and move along the curved strip. Two hooks 5121 and 5122 are mounted on the connector 513 as in FIG. 11A. A second connector 514 is connected to the connector 513 via a hinge joint 516 so the two connectors may rotate around each other. A third hook 5123 is mounted on an end of the connector 514 and a shaft 515 is mounted on the other end of the connector 515. A wheel (obstructed in FIG. 11A) is mounted on the shaft 515 with bearings installed between the wheel and the shaft 515, so that the wheel can freely rotate relative to the shaft 515. The wheel on the shaft 515 can fit in and move along the curved strip 525. The axes of the hinge joints 524 and 516, and that of the shaft 515 are all parallel to each other. The hooks 5121 and 5122 face up, and the hook 5123 faces down. The cart turning apparatus 1100 may be used to grab and turn the transport container 262, as illustrated in FIG. 11C: the hook 5121 may hook the bar 521 from below, the hook 5122 may hook the bar 522 from below, and the hook 5123 may hook the bar 522 from above. A computer controlled motor (not shown in Figures) may drive the rotation of the connector 513 around the hinge joint 524. When the connector 513 is rotated around the hinge joint 524, the wheel on the shaft 515 may slide in the curved strip 525. Then the relative distance between the hooks 5123 and 5122 may change, thus resulting in closing or loosening of the pair of hooks, as illustrated in FIGS. 11D-11F.

It should be noted that a cleaning station 29 may include a cart turning apparatus 1100 which can grab and turn a transport container 262 by an angle, and a computer controlled apparatus which may spray heated water or steaming vapors onto the interior surface of transport container 262 when the transport container is turned by the apparatus 1100. The cart turning apparatus 1100 may also be used as an unloading apparatus to unload food ingredients from a transport container to a cooking container; and in this case we may refer the cart turning apparatus 1100 as a cart unloading apparatus. It should also be noted that a different cart unloading mechanism may include a powered apparatus that grabs a transport container of a matching design, and a rotation mechanism that turns the powered apparatus around the axis of a hinge joint; where the rotation mechanism may be driven by a motor. A benefit of the cart turning apparatus 1100 is that there is no need for any powered device other than the motor which drives the rotation of the connector 513 around the axis of the hinge joint 524.

Figure 12A:
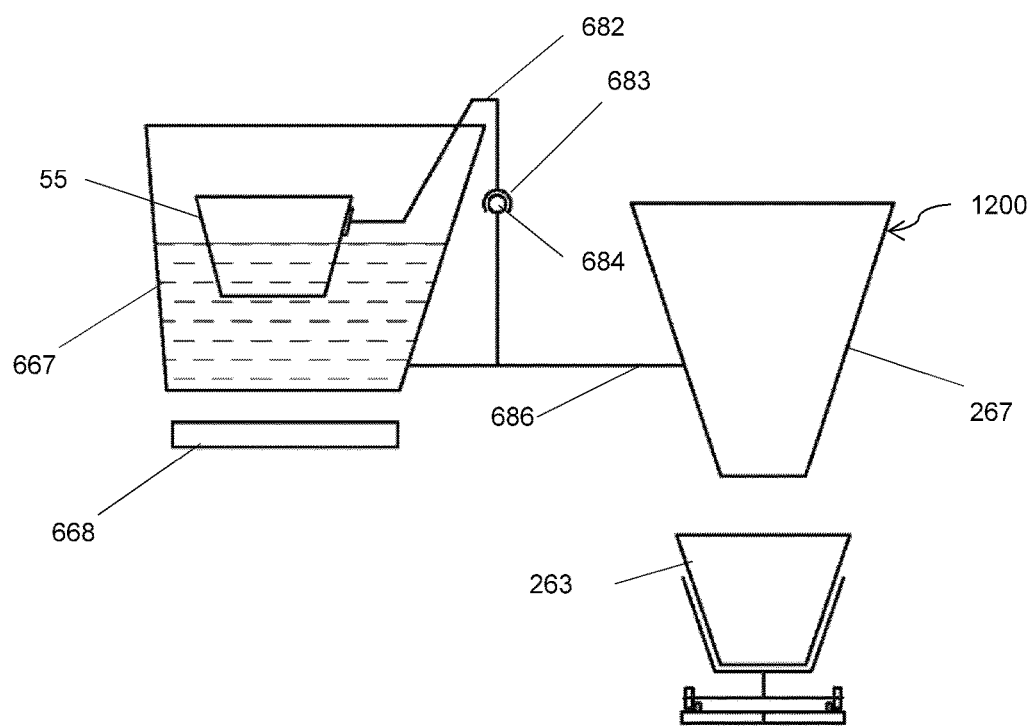
FIGS. 12A-12B illustrate an exemplified cooking apparatus by heated liquid compatible with the automated cooking system in accordance with the present invention.

In some embodiments, referring to FIG. 12A, an automated cooking apparatus 1200 consists a container 667 of heated liquid, such as water or oil, a porous basket 55 (e.g., a metal net) which may hold food ingredients, and a connector 682 that is rigidly connected with the basket 55 on one end, and is rigidly connected with the sleeve 683 of a shaft 684. The shaft 684 is fixedly connected to a support frame 686, and a computer controlled motor (not shown in Figure) may drive the rotation of the sleeve 683 around the shaft 684. When the sleeve 683 and the basket 55 are rotated in a certain direction (clockwise as shown in FIG. 12A), the food ingredients contained in the basket 55 may be turned and then dropped into a transport container 263 through a funnel 267 in the shape of a truncated cone. It should be noted that when the basket 55 is rotated out of fluid level in the container 840, the computer controlled motor may drive the basket into a rotational vibration as to shake out the liquid in the food ingredients in the basket 55. In addition, the area underneath the path of the basket may be protected by a cover so dripped liquid from the basket may be gathered and drained out. A stove 668 may heat the liquid in the container 667. It should be noted that a temperature sensor may be used to measure the temperature of the liquid in the container 667, and the power of the heater may be adjusted by an algorithm according to the difference between the targeted temperature and the measured temperature.

Figure 12B:
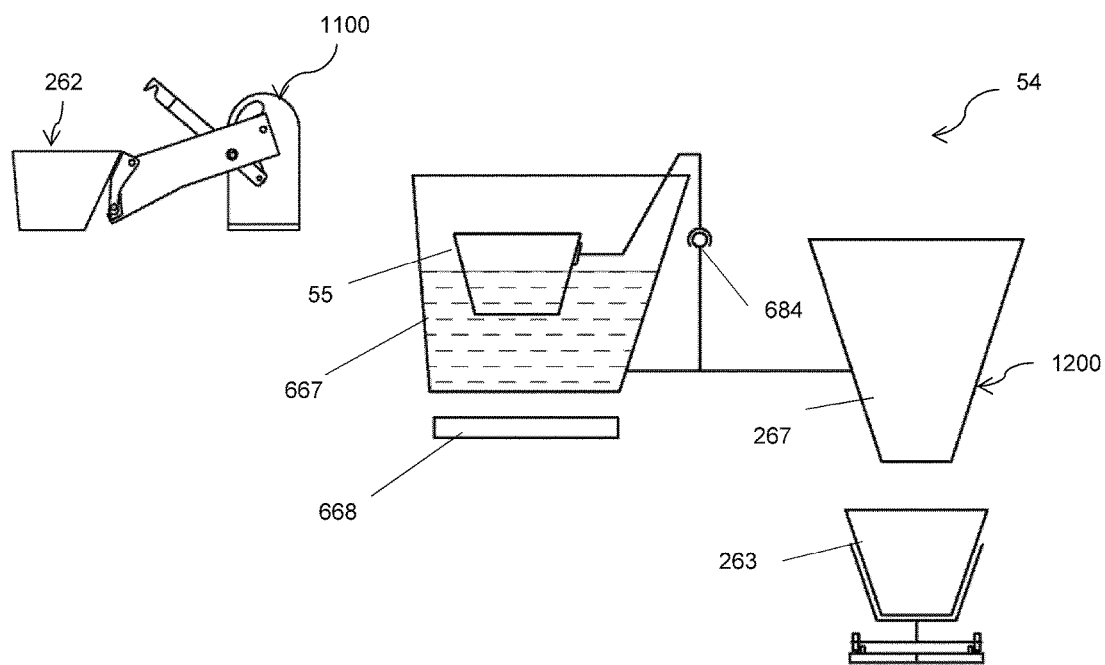

Referring to FIG. 12B, an automated cooking station 54 includes a cooking apparatus 1200 and a cart unloading apparatus 1100 positioned nearby. The food ingredients that need to be heated in the liquid can be transported in a transport container 262 to a certain position next to the cart unloading apparatus 1100. The food ingredients in the transport container 262 are turned and dropped into the basket 55 by a cart turning apparatus 1100. By a rotation around the shaft 684, the basket 55 is then lowered into the heated liquid in the container 667. After a duration of time which is calculated based on recipe and/or liquid temperature, the basket 55 is then lifted out of the heated liquid and be vibrated to help drain out the liquid in the food ingredients in the basket 55. Then the food ingredients are turned with the basket, and dropped into the transport container 263 through the funnel 267. The food ingredients cooked by the apparatus 1200 may be transported by the transport container 263 to a cooking container of another automated cooking apparatus for further processing. It should be noted that the two containers 262 and 263 could be the same one (that is moved from one side of the automated cooking apparatus 1200 to the other side, while the food ingredients is cooked in the heated liquid), but this is not a requirement.

Figure 13A:
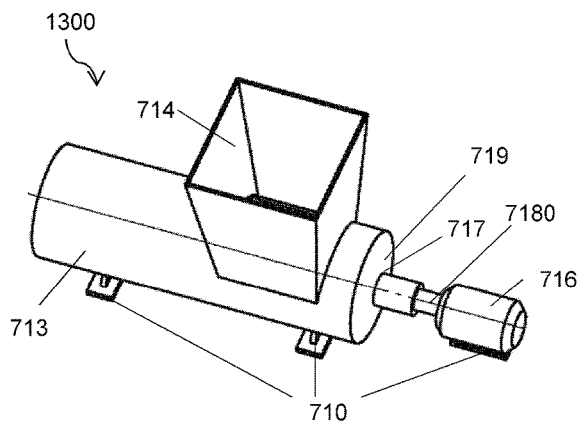
FIGS. 13A-13C illustrate an exemplified storage and loading apparatus compatible with the automated cooking system in accordance with the present invention.
Figure 13B:
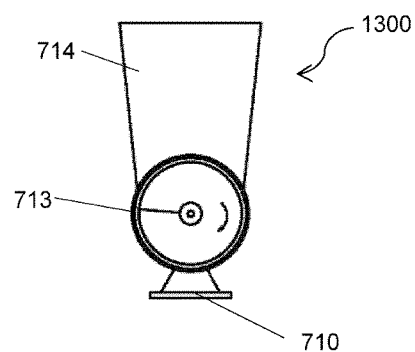
Figure 13C:
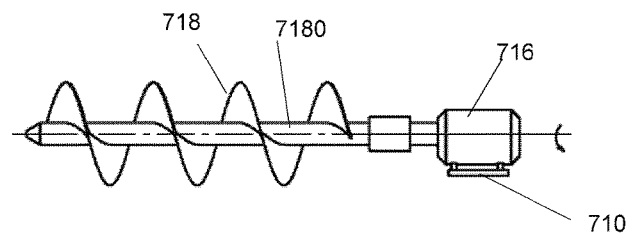

In some embodiments, referring to FIGS. 13A-13C, a storage and loading apparatus 1300 includes a spiral blade 718 turned around a shaft 7180, enclosed in a hollow cylinder 713. The shaft 7180 is partly enclosed in the hollow cylinder 713, while the spiral blade 718 is fully enclosed in the hollow cylinder 713. The hollow cylinder 713 is connected with a storage container 714 with an opening at the bottom of the storage container 714, so that the food ingredients contained in the storage container 714 may freely drop down into the hollow cylinder 713. The shaft 7180 is a mating part of a hinge joint with sleeve 717 so the shaft 7180 may freely rotate relative to the sleeve 717. A ring-shaped board 719 rigidly connects the sleeve 717 and a boundary of the hollow cylinder 713 (the right boundary as shown in FIG. 13A); the other boundary of the hollow cylinder 713 (the left boundary as shown in FIG. 13A) is open so the food ingredients may pass from inside of the hollow cylinder to the outside. A motor 716 mounted on a support frame 710 may drive the rotation of the shaft 7180. The outer surface of the hollow cylinder 713 is rigidly joined with the support frame 710. As the shaft 7180 is rotated in a certain direction, the food ingredients in the hollow cylinder 713 may be pushed by the spiral blade 718 toward the opening (at the left boundary as shown in FIG. 13A) and be dropped into a transport container underneath (not shown in Figure); and at the same time, more food ingredients from the storage container 714 may be dropped to the hollow cylinder 713. Thus, the rotation of the shaft 7180 results in loading of food ingredients from the storage container into a transport container underneath. A computer (not in Figure) may control speed, time, duration of the rotation of the motor 716 as to control the estimated amount of food ingredients to be loaded, and the time duration required for loading.

It should be noted a weighing device may be installed on a second support frame (not in Figure) as to measure the total weight of the storage and loading apparatus 1300, including the storage container 714, the hollow cylinder 713 and the food ingredients contained in them. The weighing device can measure the weights prior to, and after a load of food ingredients; so as to determine the weight of the food ingredients that has been loaded into a transport container. The information of the weighing device may be sent to a computer. If the weight of total loaded food ingredients is less than a target amount, then the computer may order another load of a calculated duration and speed. The speed or duration of each load may be carefully designed as to make sure that the total amount of food ingredients in the load does not exceed a certain maximum weight. The weighing and loading process may be repeated for a number of times, until the weight of total food ingredients cumulatively loaded into the transport container is in a certain range. Similar notes can be made for the storage and loading apparatus disclosed in FIGS. 14A-21 below.

It should also be noted that the spiral blade 718 turned around a shaft in the storage and loading apparatus 1300 may be replaced by a screw rod or other similar device. Similar notes can be made for the storage and loading apparatus disclosed in FIGS. 14A-18D below.

Figure 14A:
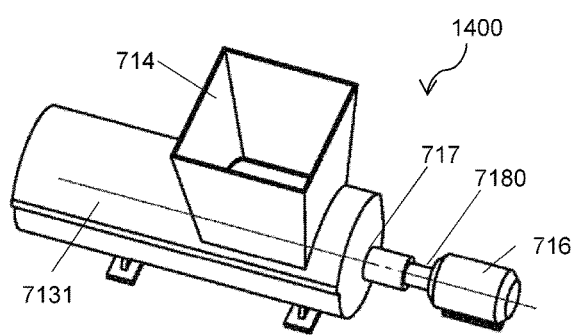
FIGS. 14A-14C illustrate an exemplified storage and loading apparatus compatible with the automated cooking system in accordance with the present invention.
Figure 14B:
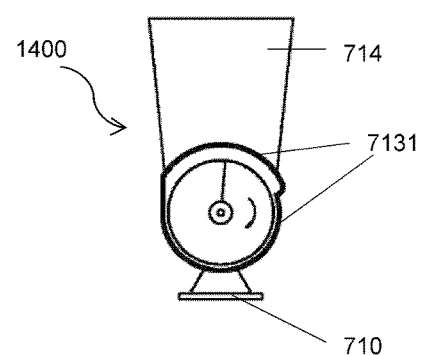
Figure 14C:
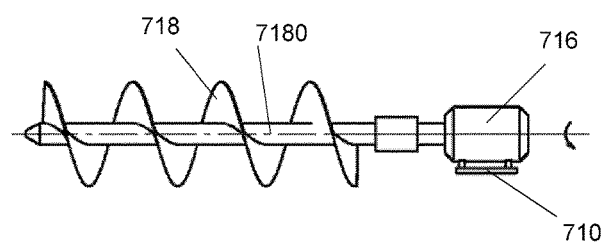

The hollow cylinder 713 in the storage and loading apparatus 1300 may be substituted by a hollow tunnel of other shape, such as a hollow truncated cone; or a hollow tunnel 7131 in the storage and loading apparatus 1400 as in FIGS. 14A-14C. The cross section of the hollow tunnel 7131 is a contour formed by a circular arc centered at the axis of shaft 7180 and an upside-down U shaped curve (FIG. 14B). This helps with preserving the shapes of certain food ingredients as they are transferred from the storage container through the hollow tunnel into a transport container underneath.

Figure 15A:
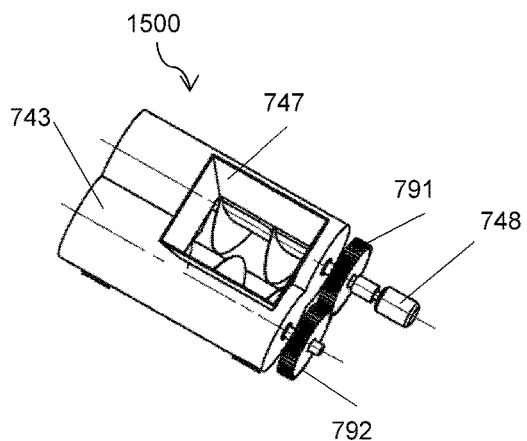
FIGS. 15A-15D illustrate an exemplified storage and loading apparatus compatible with the automated cooking system in accordance with the present invention.
Figure 15B:
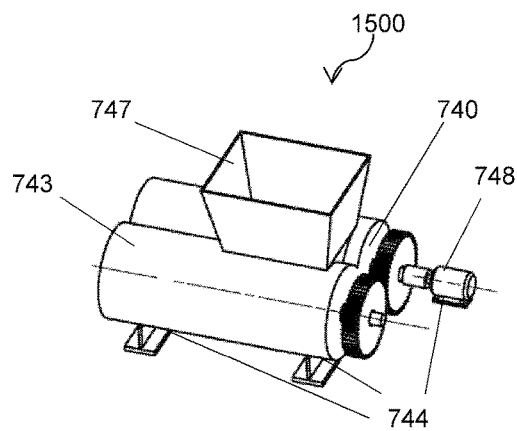
Figure 15C:
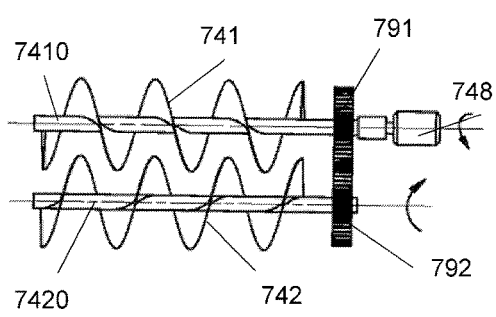
Figure 15D:
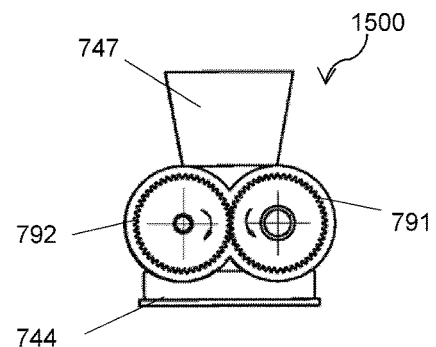

In some embodiments, referring to FIGS. 15A-15D, a storage and loading apparatus 1500 includes a pair of spiral blades 741 and 742 respectively turned around shafts 7410 and 7420, enclosed in a hollow tunnel 743. The spiral blades 741 and 742 are fully enclosed in the hollow tunnel 743 and the shafts 7410 and 7420 are partly enclosed in the hollow tunnel 743. The hollow tunnel 743 has the topology of a cylinder and each cross section of the hollow tunnel 743 is a contour formed by two circular arcs centered at the axes of the shafts 7410 and 7420 respectively. Two hinge joints connect the shafts 7410 and 7420 with a board 740 that is rigidly connected with a boundary of the hollow tunnel 743 (the right side boundary as shown in FIG. 15A or 15B); so each shaft, 7410 or 7420, may freely rotate relative to the board 740. A motor 748 mounted on a support frame 744 drives the rotation of the shaft 7410. The other boundary of the hollow tunnel 743 (the left boundary as shown in FIGS. 15A-15B) is open. The hollow tunnel 743 is connected with a storage container 747 with an opening at the bottom of the storage container 747, so that food ingredients contained in the storage container 747 may freely drop down into the hollow tunnel 743. The outer surface on the wall of the hollow tunnel 743 is rigidly connected with the support frame 744. Two gears of identical size 791 and 792, both outside of the hollow tunnel, are respectively mounted on and are concentric with the shafts 7410 and 7420. The two gears 791 and 792 are engaged, so the shafts 7410 and 7420 may rotate in opposite direction with equal speed. One of the spiral blades 741 and 742 is left-handed and the other one is right-handed. As the shaft 7410 is rotated in a certain direction, the food ingredients in the hollow tunnel 743 may be pushed by the spiral blades 741 and 742 toward the left boundary and then be dropped into a transport container underneath (not shown in Figure); and at the same time, more food ingredients from the storage container 747 may be dropped to fill the hollow tunnel 743. Thus, the rotation of the shaft 7410 by the motor 748 results in a load of food ingredients from the storage container to a transport container underneath. A computer (not in Figure) may control speed, time, duration of the rotation of the motor 748 as to control the estimated amount of loaded food ingredients, and the time of the loading.

Figure 16A:
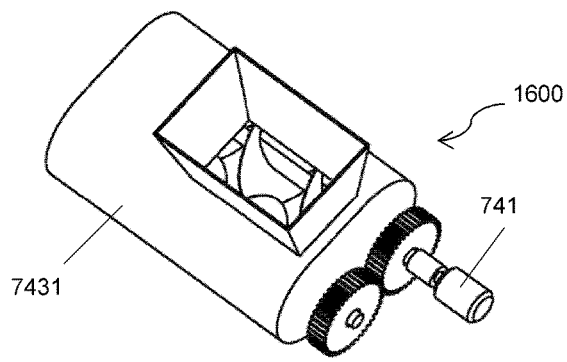
Figure 16B:
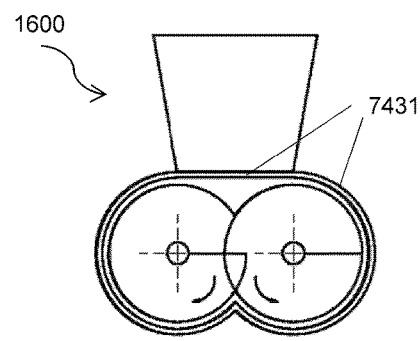
Figure 16C:
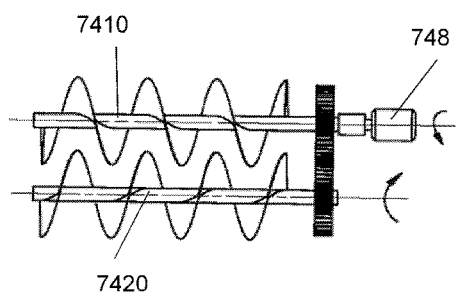
Figure 17A:
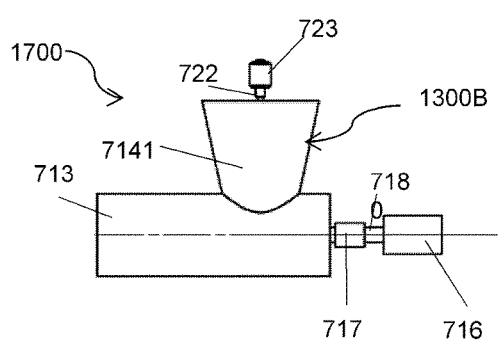
Figure 17B:
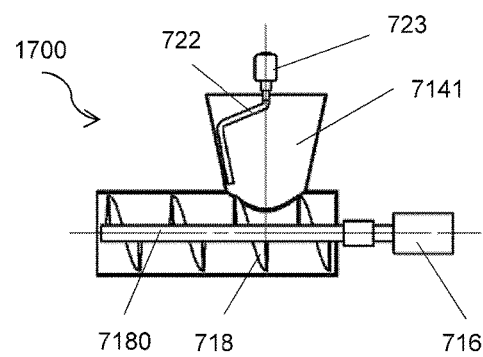
Figure 17C:
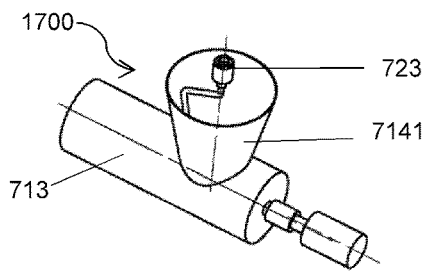
Figure 17D:
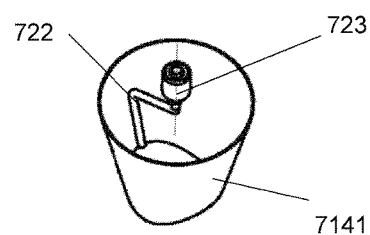
Figure 18A:
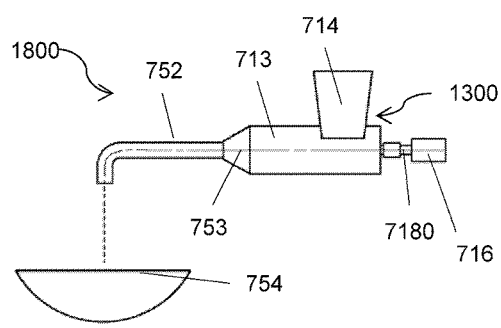
Figure 18B:
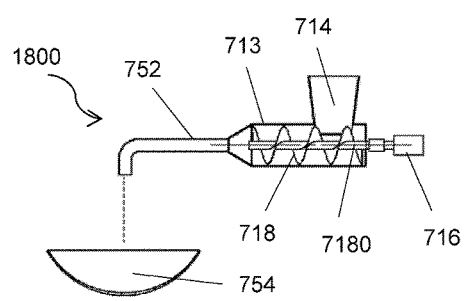
Figure 18C:
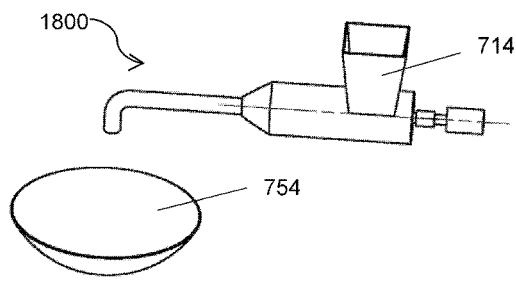
Figure 18D:
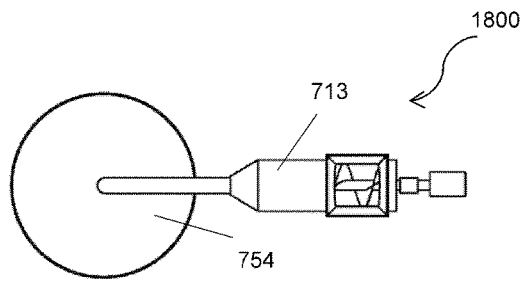

It should be noted that the hollow tunnel 743 in the storage and loading apparatus 1500 may be substituted by a hollow tunnel of other shape, such as a hollow tunnel 7431 in the storage and loading apparatus 1600, in FIGS. 16A-16C. The cross section of the hollow tunnel 7431 is a contour made of a straight arc and two circular arcs respectively centered at the axes of shafts 7410 and 7420 (FIG. 16B). This helps with preserving the shapes of certain food ingredients that are transferred from the storage container through the hollow tunnel into the transport containers underneath.

In some embodiments, referring to FIGS. 17A-17D, a storage and loading apparatus 1700 includes a storage and loading apparatus 1300B and a mixing apparatus consisting of an object 722 that can be rotated by a motor 723, where the storage and loading apparatus 1300B can be implemented the same as the apparatus 1300 (FIGS. 13A-13C) except that the storage container 714 in the apparatus 1300 is substituted by a storage container 7141 of a different shape. The frame of the motor 723 is fixedly installed on a cover of the storage container 7141. A part of the inner surface of the storage container 7141 may be rotationally symmetric around the axis of the motor 723, although this is not a requirement. The object 722 is inside the storage container 7141, and may stir and mix the food ingredients in the container 7141 A computer (not in Figure) may control the motor 723. As shown in Figures, the axis of the motor 393 is vertical; but it should be noted that the axis of the motor 723 may also be designed to be horizontal or in an inclined direction. The object 722 can have a shape of a bent rod, a spiral blade turned around a shaft, or a screw rod.

In some embodiments, referring to FIGS. 18A-18D, a storage and loading apparatus 1800 includes the storage and loading apparatus 1300 and a tube 752 which joins with the open boundary of the hollow cylinder 863 by a hollow truncated cone 753. Food ingredients contained in the storage container 714 may be dropped into the hollow cylinder and then be pushed to the tube 752 and eventually be dropped into a cooking container 754. A computer may control the motor 716. It should be noted that a computer controlled shut-off valve may be installed on the tube 752. The storage and loading apparatus may be used to load different types of sauces or semi-solid food ingredients directly into a cooking container.

During time periods when the storage and loading apparatus are not in use, the food ingredients contained in the storage containers may need to be sealed as to keep them fresh. An automated cap may be mounted near the outlet of the storage and loading apparatus in 13A-18D, as to seal the food ingredients contained in a storage container and the hollow tunnel. Some care may be taken to design the cap, so that the cap never has to touch the food ingredients, even if the food ingredients are sticky. The cap may consist of a large enough horizontal plate (which may be slid or rotated away using a mechanism and a computer controlled motor) and be positioned at below the outlet of the hollow tunnel; while the space between the hollow tunnel's open boundary and the mating part of the horizontal cap gets enclosed and sealed.

In some embodiments, referring to FIGS. 19A-19B, a storage and loading apparatus 1900 consists of a storage container 810 with an outlet 811 at its bottom, and a sliding plate 812 which may open or close the outlet 811 so the food ingredients in the storage container 810 may or may not drop into the outlet 811. The plate 812 may slide through a slit 813 cut from a wall of the container 810, may be pulled or pushed by a rod 814 from outside of the container 810 as to open or close the outlet 811. A computer controlled, motorized lead screw mechanism 815 drives the rod 814 in a linear motion. A connector 816 joins the frame of the motorized lead screw mechanism 815 and the support frame of the storage container 810. Underneath the outlet 811, a curved panel 819 which is rigidly connected with the storage container 810, a curved panel 821 and the plate 812 form a chamber 818 for food ingredients (FIG. 19A). A flat section of the curved panel 821 may slide along a flat section 817 of the outer surface of the storage container 810, and at the same time, another section 822 of the curved panel 821 may slide parallel along a section of the panel 819. The space between any of the sliding pairs is minimal so that the food ingredients may not pass through in meaningful quantity. A rod 823 is rigidly connected with the curved panel 821. A computer-controlled, motorized lead screw mechanism 824 drives the rod 823 in a linear motion, as to pull or push the curved panel 821 into parallel sliding relative to the sections of the storage container 810 and the panel 819. A connector 825 joins the frame of the motorized lead screw mechanism 824 and the support frame of the storage container 810. When the plate 812 is slid to close the outlet 811, and curved panel 821 is slid sufficiently downward, then the chamber 818 opens up to the space below (FIG. 19B), and then the food ingredients contained in the chamber 818 may drop down from an opening 826 (directly or through a funnel) into a transport container (not in FIGS. 19A and 19B) underneath. To load a targeted volume of food ingredients, the curved panel 821 may be slid into a calculated height as to adjust the volume of the chamber 818. Then slide the plate 812 open as to let food ingredients drop from the storage container 810 into the chamber 818. Afterwards, the plate 812 may be closed, and the curved panel 821 may be slid sufficiently downward so that the food ingredients in the chamber may be dropped down into a transport container underneath. It should be noted that a mixing apparatus similar to the one in apparatus 117 may be mounted to mix the food ingredients in the storage container 810 so the food ingredients may easily fall down.

It should be noted that the storage and loading apparatus 1900 may also be used to dispense precise amounts of salt or other dry ingredients of small diameters. The salt may also be transferred directly from a storage container to the cooking container, without using the transport containers.

In some embodiments, referring to FIGS. 20A-20B, a clipping apparatus 2000 includes a tube 830 and a smaller tube 831 that may slide inside the tube 830. The interior of the tube 831 is a nut 832. The ends of legs 841 are connected to the bottom ring of the tube 831 via some hinge joints 843, one hinge joint for each leg, so that each leg 841 may rotate relative to the tube 831 around the axis of the respective hinge joint 843. A middle part of each leg 841 is joined to the end of a connector 842 via a hinge joint 844, with the other end of the connector 842 joined to the outer surface of the tube 830 via a hinge joint 845. The three hinge joints 843, 844 and 845 corresponding to a leg 841 have parallel axes. The axes of the hinge joints 843, 844 and 845 may be perpendicular to the axis of the tube 830, but this is not a requirement. A computer controlled motor 835 drives the rotation of a screw rod 833 which mates with the nut 832, and hence pushing or pulling the tube 831 to slide relative to the tube 830. The legs 841 then open or close accordingly. The clipping apparatus can be used to catch food ingredients from a container.

It should be noted a clipping apparatus may also include a single rotatable leg 841 as in FIGS. 20A-20B, and one or more fixed legs that are rigidly connected with the tube 830. The disclosed systems and methods can be compatible with other implementations for such clipping apparatus.

Figure 21:
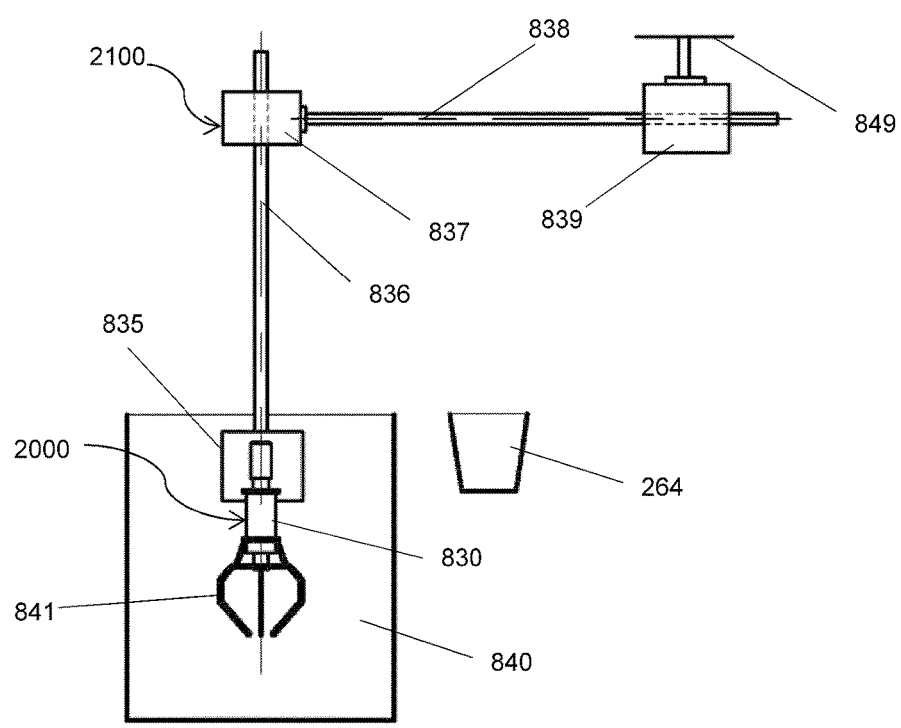
FIG. 21 illustrate an loading apparatus compatible with the automated cooking system in accordance with the present invention.

In some embodiments, referring to FIG. 21, an loading apparatus 2100 consists of a clipping apparatus 2000, a first screw rod 836 that is rigidly connected with the tube 830 of the clipping apparatus 2000 via a connector 835, a first motorized lead screw mechanism 837 that can move the rod 836 along a vertical direction, wherein a sliding pair restricts the rod and the screw mechanism 837 to vertically sliding. A second screw rod 838 is rigidly connected to the frame of the first motorized lead screw mechanism 837. A second lead screw mechanism 839 mounted on a support frame 849 can move the screw rod 838 in a horizontal linear motion, wherein a sliding pair restricts the rod 838 and the screw mechanism 837 to horizontally sliding. Thus the clipping apparatus 2000 may be moved to inside a storage container 840 which may hold food ingredients, or to above a transport container 264. The loading apparatus 2100 works as follows. The clipping apparatus 2000 with its legs 841 opened, may be moved to inside the storage container 840, until the legs touch some food ingredients. Then the legs close, grabbing some food. Then the clipping apparatus 2000 is moved to above the transport container 264, and the legs 841 open wide and the food ingredients grabbed by the clipping apparatus 2000 drops into the transport container 264. It should be noted that a pressure sensor may be mounted with the motorized lead screw mechanism 837 as to stop it from pushing down the rod 836 when the clipping apparatus 2000 meets with a higher than a certain resistance force from the food ingredients in the container.

Alternatively, a robotic arm may also be used to grab and transfer food ingredients from storage containers to transport containers.

It should be noted that the loading apparatus discussed in FIGS. 13A-17D, 19A-21 may be also used to dispense food ingredients directly into the cooking containers. In fact, depending on the menu and other factors, some food ingredients, especially some of the liquid, powder, or some semi-solid food ingredients, may be more conveniently dispensed into the cooking containers without the use of any transport containers.

In some cases, food ingredients may stick together or stick onto the interior surfaces of a storage container, and thus it can be difficult to dispense the food ingredients from the storage container. The mixing apparatus consisting of a rotating object inside the storage container (similar to the object 722 in FIG. 17A-17D) can be used to facilitate the dispensing of food ingredients from the storage container. Alternatively, a movement mechanism may be mounted to vibrate, rotate, or otherwise move the storage containers as to stir or shake the food ingredients.

Figure 22:
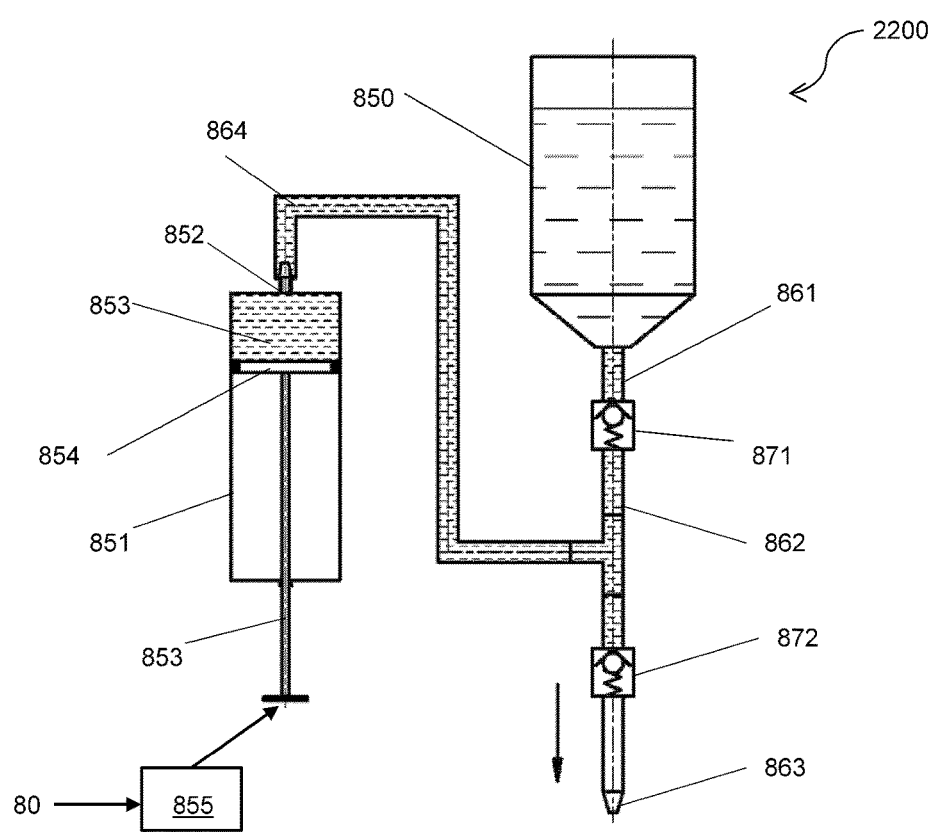
FIGS. 22-24 illustrates exemplified liquid storage and loading apparatus compatible with the automated cooking system in accordance with the present invention.

In some embodiments, referring to FIG. 22, a liquid storage and loading apparatus 2200 consists of a storage tank 850 which may contain liquid ingredients, a pipe 861 from the tank 850 to the inlet of a valve 871, a second pipe 862 from the outlet of the valve 871 to the inlet of a valve 872, and a third pipe 863 from the outlet of the valve 872 to an outlet 863 above a cooking container (not in FIG. 22). The valves 871 and 872 allow the liquid to flow from their inlets to outlets when the liquid at the inlets has a higher pressure (higher by a certain threshold) than the liquid at the outlets, but never backward. A pipe 864 connects a middle part of the pipe 862 to the tip 852 of a syringe tube 851. A plunger 854 can be pushed and pulled by a rod 853, along inside the tube 851, allowing the chamber 853 of the tube 851 to take in or expel the liquid ingredient. A transport mechanism 855 can pull or push the rod 853 via a lead screw or ball screw mechanism under the computer system 80 (FIG. 1), while a sliding pair may restrict the rod 853 to a parallel sliding (not shown in Figure). When the plunger 854 is pulled outward (downward as in FIG. 22) by a certain distance, a certain amount of liquid can be pulled into the tube chamber 853, drawing liquid from the tank 850, but not from the pipe 863 as the valve 872 never allows the liquid to flow backward. When the plunger 854 is pushed inward by a certain distance, a certain amount of liquid can be pushed out of the tube chamber 853 into the pipe 864 and 862, thus pushing the same amount of liquid through the valve 872 into the pipe 863, and then to the cooking container via the outlet 863; while the valve 871 never allows the liquid to flow backward. Thus, the apparatus 2200 may transfer a targeted amount of the liquid into the cooking container by pushing the plunger 854 inward by a calculated distance.

Figure 23:
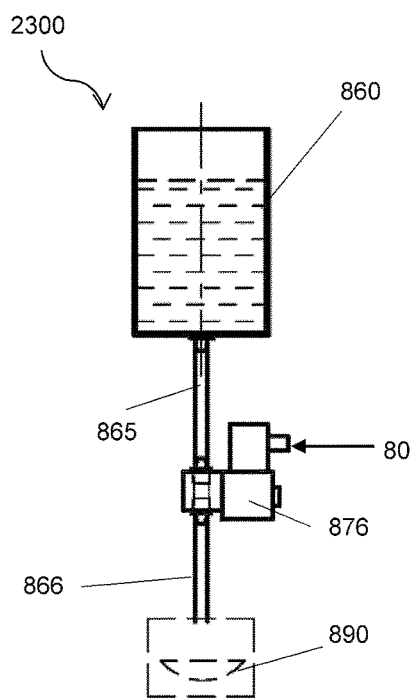

In some embodiments, referring to FIG. 23, a liquid storage and loading apparatus 2300 consists of a storage tank 860 which may contain liquid ingredients, a pipe 865 from the tank 860 to the inlet of a valve 876, and another pipe 866 from the outlet of the valve 876 to an outlet above a cooking container 890 (not scaled in size). The computer 80 controls the valve 876. The valve may be opened for a calculated period of time, as to allow a targeted amount of liquid to pass the valve. The bottom of the storage tank 860 is positioned higher than the outlet of the tube 866, so the liquid may flow from the storage tank to the outlet of the tube 866 when the valve 876 is opened.

Figure 24:
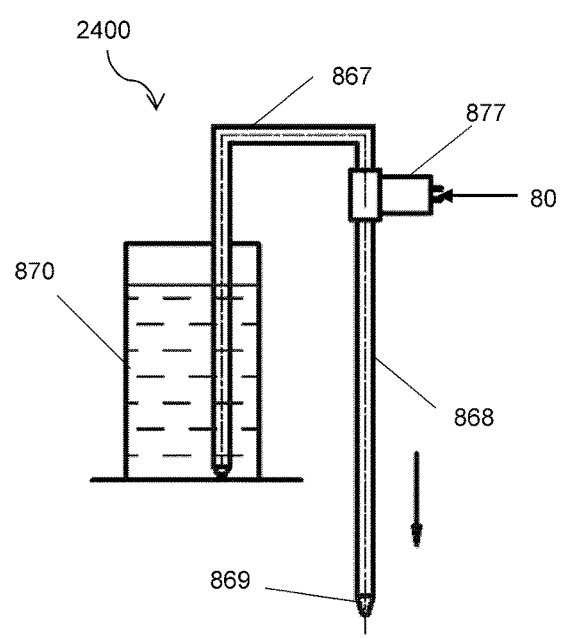

In some embodiments, referring to FIG. 24, a liquid storage and loading apparatus 2400 consists of a storage tank 870 which may contain liquid ingredients, a pipe 867 from the tank 870 to the inlet of a pump 877, and another pipe 868 from the outlet of the pump 877 to an outlet 869 above a cooking container (not in Figure). The computer 80 controls the pump 877 so it can pump a targeted amount of liquid to flow out through the outlet 869 in a calculated time period.

It should be noted that the pump 877 in the liquid storage and loading apparatus 2400 may be substituted by a submersible pump that is positioned inside the storage tank 870, in which case the pipe 867 may or may not be needed.

In each of the liquid storage and loading apparatus 2200, 2300 or 2400, a flow sensor may be installed at a point on a tube in order to measure the total amount of liquid ingredients transferred to the cooking container. The information of the flow sensor may be sent to the computer as to monitor the amount of liquid ingredients transferred to the cooking container.

Figure 25:
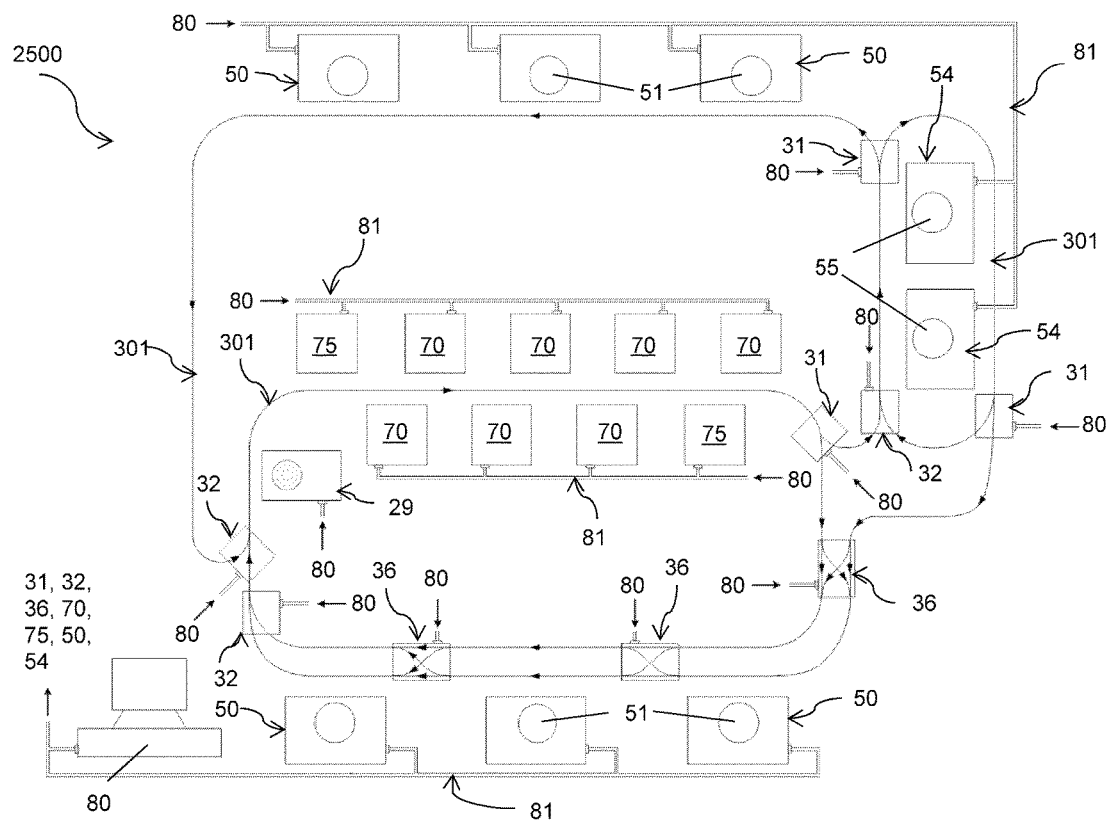
FIG. 25 is a schematic view of another implementation of automated cooking system in accordance with the present invention.

In some embodiments, referring to FIG. 25, an automated cooking system 2500 includes a multiple of cooking stations 50 and cooking stations 54, a multiple of storage stations 70, a cleaning station 29. A network of rail tracks 301 links the storage stations 70, the cooking stations 50 and 54, the cleaning station 29. The rail track network 301 includes split one-to-two track switches 31, two-to-one track switches 32, and two-to-two track switches 36. Each cooking station 50 includes a cooking apparatus which has one or more cooking containers 51, a cart unloading apparatus 1100 which transfers food ingredients from the transport containers on the mini vehicles to the cooking containers. Each storage station 70 includes one or more storage containers of food ingredients, a loading apparatus to unload the food ingredients from the storage containers into the transport containers of the mini vehicles. Each cooking station 54 includes a cooking apparatus with a porous basket 55 that may be immersed in a container of heated liquid, an apparatus to unload food ingredients from the transport containers of the mini vehicles on one side (the left side as in FIG. 12B) of the liquid container 55 to the liquid container 55, an apparatus to transfer cooked food from the basket 55 to transport containers on the other side of the liquid container (see FIG. 12A-12B). The cleaning station 29 includes an apparatus 1100 that turns the transport containers by an angle, and a cleaning apparatus that can spray hot water or steam into the inner surface of the transport containers. A computer 80 is connected via wires 81 with the cooking stations 50 and 54, the storage stations 70, the cleaning station 29, and the track switches 31, 32 and 36. The computer 80 has a list of recipes stored in its memory and controls: movement and stops of the mini vehicle at stations; loading of food ingredients from storage containers to the transport containers of the mini vehicles, quantity of food ingredients to be loaded from storage containers to the transport containers; unloading of food ingredients from transport containers to cooking containers 51 and baskets 55; transfer of cooked food from cooking containers 51 to holders of cooked foods; loading of cooked food from baskets 55 to transport containers; the cleaning apparatus; and the cooking apparatus.

Still referring to FIG. 25, the automated cooking system 2500 includes stations 75 each of which includes an automated pre-processing apparatus 75 used to pre-process the food ingredients before they are stored in storage containers or directly transferred into transport containers in the mini vehicles. Examples of pre-processing operations include washing, cutting, chopping, grinding, blending, etc. The computer 80 is connected to the stations 75 via wires 81 as to control the operations therein.

In some cases, some food ingredients of a dish needs a round of cooking in heated liquid (e.g., deep frying in heated oil, or boiling in heated water) at a cooking station 54 before being cooked at a cooking station 50. The food ingredients may be loaded into a transport container of a mini vehicle, and then moved to a position at a cooking station 54, and unloaded into the porous basket 55 therein. After cooking in the heated liquid, the food ingredients may be loaded into a transport container of a mini vehicle (could be the same mini vehicle though not a requirement), and then transported to another cooking station for further processing. It is possible that, for example, a food ingredient of a dish first needs to be boiled in heated water, then fried in heated oil, and then boiled again in heated water, and then cooked at a cooking station 51. The automated cooking system 2500 allows such processes to be done, with one of the cooking stations 54 having heated oil and the other heated water. The transport of food ingredients from a basket 54 to another basket 54, and from a basket 54 to a cooking container 51, may be done using the transport containers (or alternatively, by a local transfer mechanism).

Each cooking station 50 may also include a transferring apparatus which transfers cooked food from the cooking containers into holders of cooked food. Moreover, a cooking apparatus may include one or more liquid storage and loading apparatus 2200 (FIG. 22), 2300 (FIG. 23), 2400 (FIG. 24) that transfer liquid ingredients from storage tanks directly to the cooking containers 51 or 55. A cooking apparatus may also include storage and loading apparatus that directly transfer other ingredients into cooking containers 51 or 55. The computer 80 may control the above mentioned apparatus.

The computer 80 may further control: the time periods and the variable power of a heating apparatus of the cooking container, the transport mechanism that moves the cooking container for the purpose of mixing or stirring, or other alternative mixing or stirring apparatus.

It should be noted that the mini vehicles in 2500 (FIG. 25) can be driven by motors. Alternatively, the mini vehicles in 2500 may be driven by gravitational force on some parts of the rail track network 301.

In the automated cooking system 2500 (FIG. 25), the mini vehicles may all go in one direction, as directed in the Figure, although this is not a requirement. The transfers of food ingredients from different storage containers to different transport containers may occur at the same time or in otherwise overlapped time.

Figure 26:
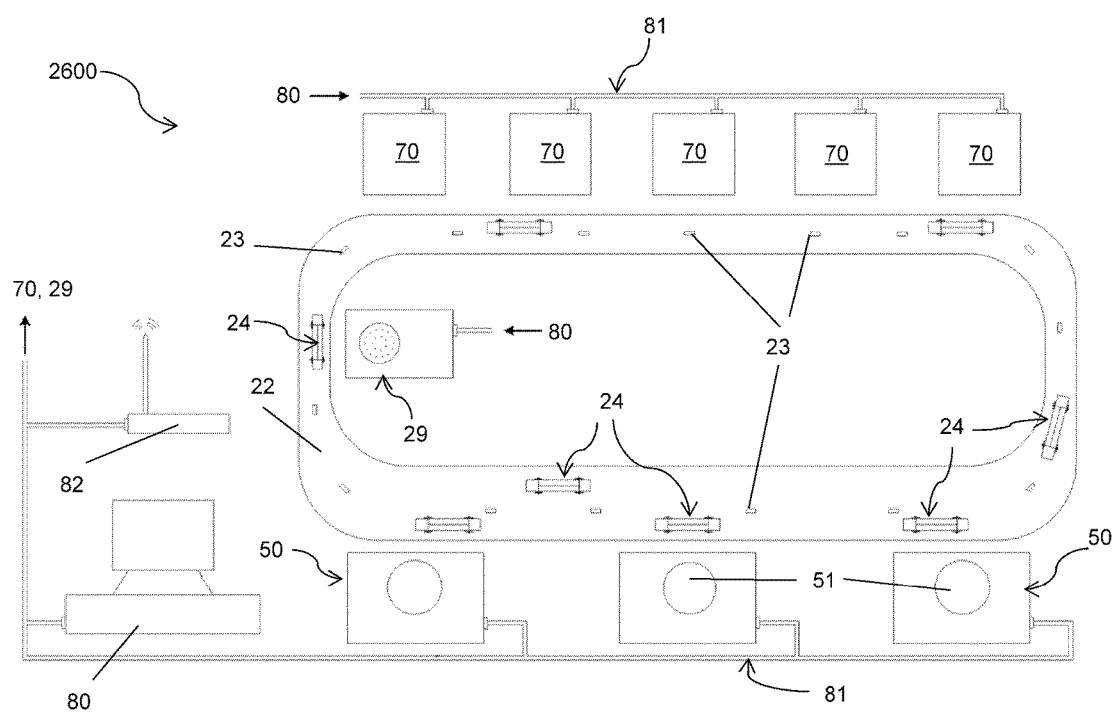
FIG. 26 is a schematic view of another implementation of automated cooking system in accordance with the present invention.

In some embodiments, referring to FIG. 26, an automated cooking system 2600 includes a multiple of cooking stations 50, a multiple of storage stations 70, and a cleaning station 29. A road 22 connects the storage stations 70, the cooking stations 50 and the cleaning station 29. A multiple of mini vehicles 24 move on the road 22. Each mini vehicle carries one or more transport containers which may hold food ingredients. A multiple of RFID tags 23 are laid and fixed on the road 22, and some sensors are installed on mini vehicles 24 as to read the tags 23 for the purpose of positioning. A master wireless device 82 is connected with a computer 80 via wires 81, and communicates with some slave wireless devices installed on the mini vehicles 24 so that the computer 80 may communicate with and control the mini vehicles 24. The information read by the sensors on the mini vehicles 24 are sent to the computer 80 by the wireless communication as to determine the positions of the mini vehicles. Each cooking station 50 includes a cooking apparatus which has one or more cooking containers 51, a cart unloading apparatus which unloads food ingredients from the transport containers on the mini vehicles to the cooking containers. Each storage station 70 includes one or more storage containers of food ingredients, a loading apparatus to transfer the food ingredients from the storage containers into the transport containers of the mini vehicles. The cleaning station 29 includes an apparatus that turns the transport containers by an angle and/or by a distance, and a cleaning apparatus that can spray hot water or steam into the inner surface of the transport containers. The computer 80 is connected via the wires 81 with the cooking stations 50, the storage stations 70, and the cleaning station 29. The computer 80 has a list of recipes stored in its memory and controls: movement and stops of the mini vehicle at stations; loading of food ingredients from storage containers to the transport containers of the mini vehicles 24, quantity of food ingredients to be loaded from storage containers to the transport containers; transferring of food ingredients from transport containers to cooking containers 51; transferring of cooked food from cooking containers 51 to holders of cooked foods; the cleaning apparatus; and the cooking apparatus.

It should be noted that the RFID tags 23 in the automated cooking system 2600 may be substituted with tags of images; and the sensors on the mini vehicles are vision sensors that may read the images. It should also be noted that instead of using RFID tags 23 and sensors, we may use an indoor positioning system or other positioning system.

Figure 27:
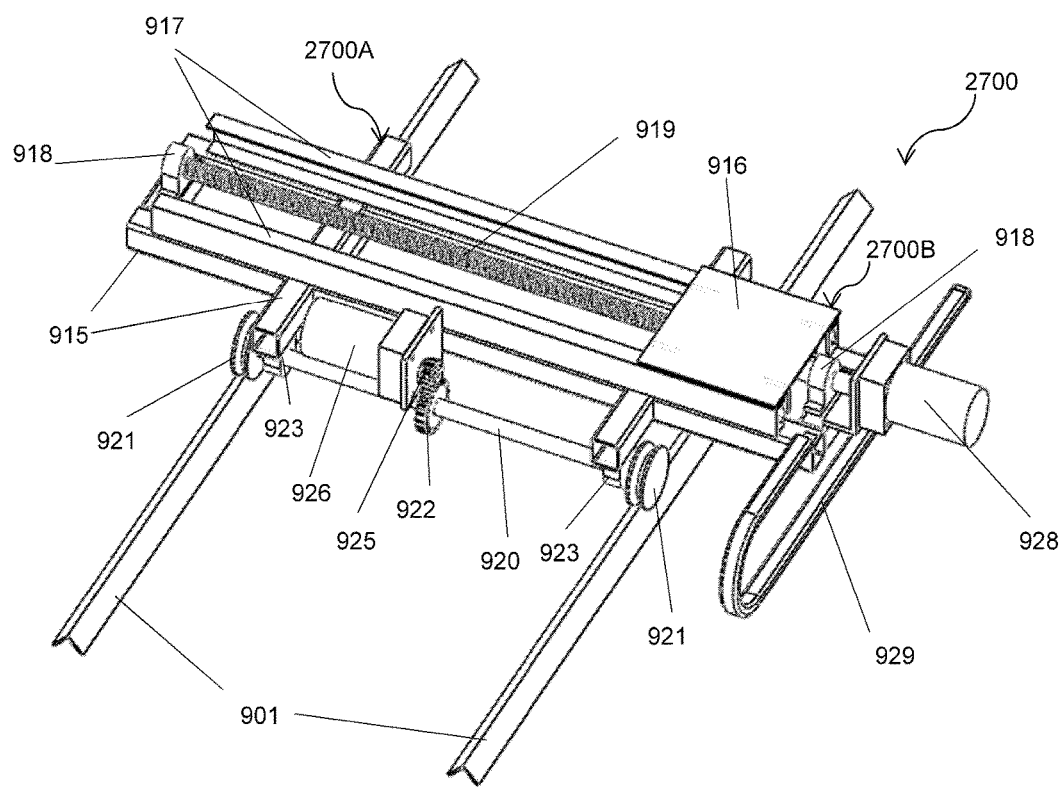
FIGS. 27-32 illustrate exemplified transport apparatus compatible with the automated cooking system in accordance with the present invention.

In some embodiments, referring to FIG. 27, a transport apparatus 2700 includes a track consisting of a pair of sharp rails 901, and a mini vehicle 2700A. The mini vehicle 2700A includes a frame 915, two shafts 920 which are joined to the frame 915 by bearings 923. Two wheels 921 are rigidly mounted on each shaft 920 and are positioned on the sharp rails 901, one wheel on each rail (one shaft 920 and the corresponding wheels 921 are obstructed in the Figure). The axes of the wheels 921 coincide with the axis of the corresponding shaft 920. A gear 922 is mounted on one of the shafts 920 and is concentric with the shaft. Another gear 925 is mounted on the shaft of a motor 926 and is concentric with the shaft of the motor 926. The gears 922 and 925 are engaged. The frame of the motor 926 is rigidly connected to the frame 915. On the other hand, a pair of straight rails 917 are mounted atop the frame 915, forming a rail track. A sub-vehicle 2700B consisting of a frame 916 and two pairs of wheels (not seen in Figure) whose shafts are joined to the frame 916 by bearings, with two wheels positioned on each of the rails 917. One or more holders (not in Figure) mounted atop the frame 916 may hold transport containers of food ingredients. A screw rod 919 is connected with the frame 915 via a pair of bearings 918, so the screw rod 919 may rotate freely relative to the frame 915. A lead screw nut (obstructed) fixedly mounted below the frame 916 is engaged with the screw rod 919, so that a rotation of the screw rod 919 translates into a linear movement of the sub-vehicle 2700B. The frame of a motor 928 is fixedly connected with the frame 915; and the shaft of the motor 928 is fixedly connected and is concentric with the screw rod 919. The rails 917 and (the axis of) the screw rod 919 are all parallel to each other. As the motor 928 rotates the screw rod 919, the mini vehicle 2700B moves linearly along the rails 917. A cable drag chain 929 contains electric wires (not shown in Figure) that connect the motors 926 and 928 to an electric source. The cable drag chain may change shape and move along with the mini vehicle 2700A. A computer (not shown in Figure) may control the motors 926 and 928.

We note that the lead screw nut with the sub-vehicle 2700B may be replaced by a ball screw nut. The sub-vehicle 2700B may go two ways, and the mini vehicle 2700A may also go two ways.

Figure 28:
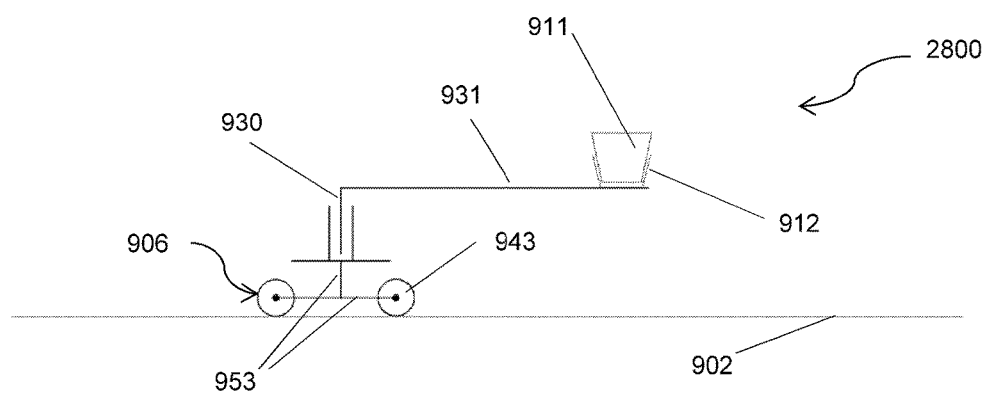

In some embodiments, referring to FIG. 28, a transport apparatus 2800 includes a rail track 902, a mini train 906 which may travel along the rail track 902. The mini train 906 includes a frame 953, wheels 943 whose shafts are joined to the frame 953 by bearings. The wheels 943 are restricted to travel on the rail track 902. The sleeve of a shaft 930 is fixedly connected with the frame 953. A connector 931 connects the shaft 930 and the basket shaped holder 912 which holds a transport container 911. A computer controlled motor (not in Figure) may drive the rotation of one or more wheels 943; and another (computer controlled) motor may drive the rotation of the shaft 930 around its sleeve.

Figure 29:
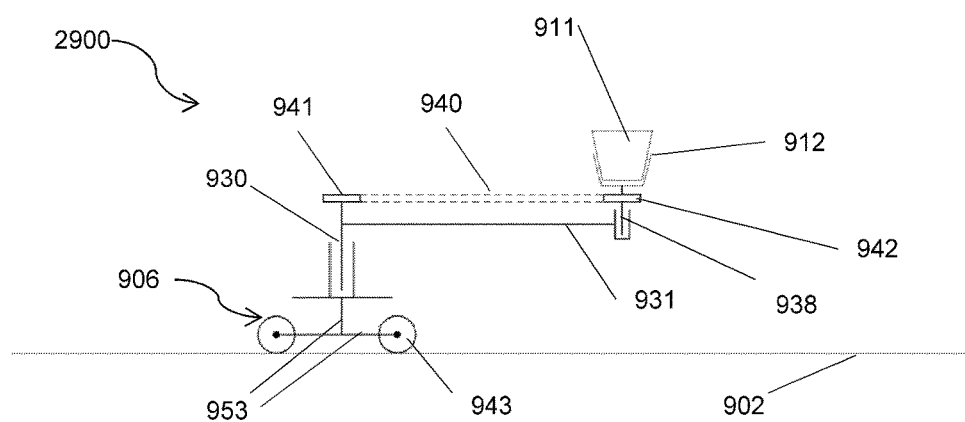

In some embodiments, referring to FIG. 29, a transport apparatus 2900 includes rail track 902, a mini train 906 which may travel along the rail track 902. The mini train 906 includes a frame 953, wheels 943 whose shafts are joined to the frame 953 by bearings. The wheels 943 are restricted to travel on the rail track 902. The sleeve of a shaft 930 is fixedly connected with the frame 953. A connector 931 connects the shaft 930 and the sleeve of a shaft 938. Two belt wheels 941 and 942 of identical radii are rigidly mounted on the shafts 930 and 938 respectively, so that the belt wheel 941 is concentric with the shaft 930 and the belt 942 is concentric with the shaft 938. A belt 940 wraps around the belt wheels 941 and 942 so they may rotate synchronously. A basket shaped holder 912 is rigidly connected with the shaft 938 and is above the belt wheel 942. The holder 912 holds a transport container 911 which may contain food ingredients. A computer controlled motor (not in Figure) may drive the rotation of one or more wheels 943; and another (computer controlled) motor may drive the rotation of the shaft 930 around its sleeve.

Figure 30:
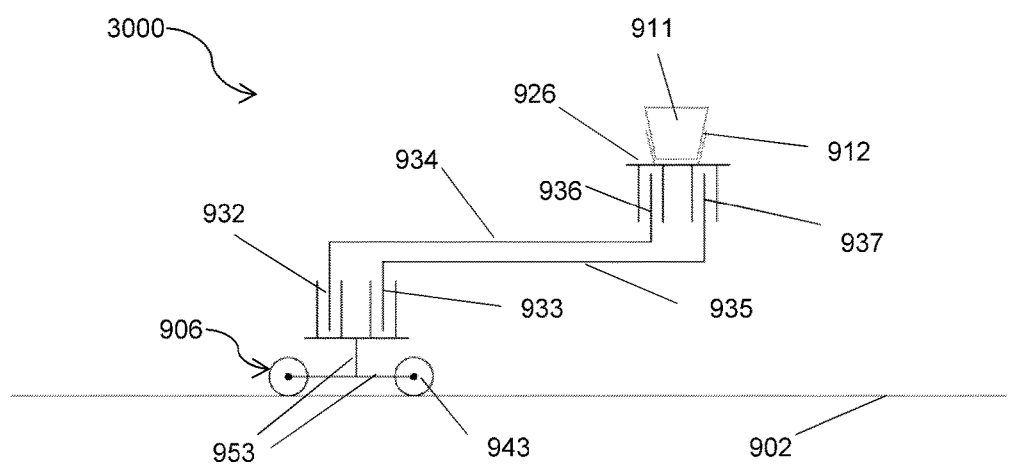

In some embodiments, referring to FIG. 30, a transport apparatus 3000 includes rail track 902, a mini vehicle 906 which may travel along the rail track 330. The mini vehicle 906 includes a frame 953, and wheels 943 whose shafts are joined to the frame 953 by bearings. The wheels 943 are restricted to travel on the rail track 330. The sleeves of two shafts 932 and 933 are fixedly connected with the frame 953. A connector 934 joins the shaft 932 with a shaft 936; and another connector joins the shaft 933 with another shaft 937. A frame 926 is rigidly connected with the sleeves of the shafts 936 and 937. A basket shaped holder 912 is mounted on the frame 926. The holder 912 holds a transport container 911 which may contain food ingredients. A computer controlled motor (not in Figure) may drive the rotation of one or more wheels 943; and another (computer controlled) motor may drive the rotation of the shaft 932 around its sleeve.

Figure 31:
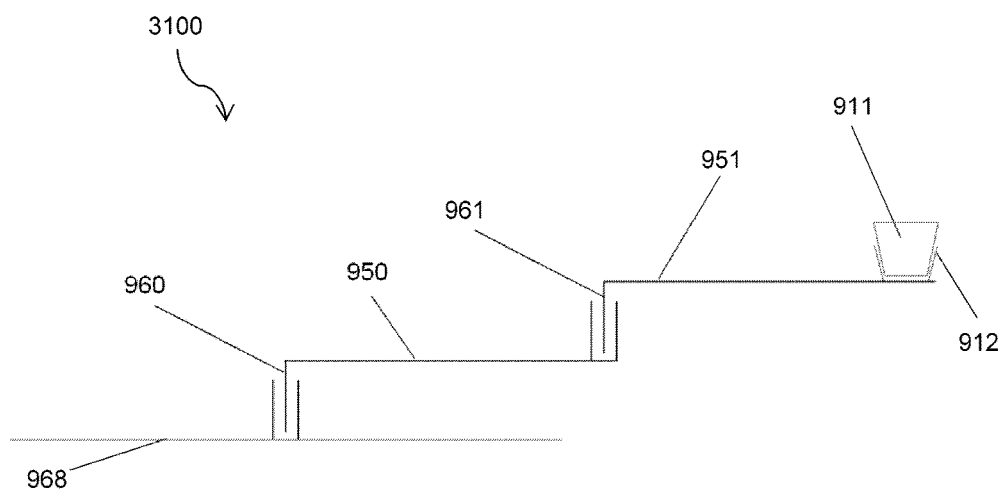

In some embodiments, referring to FIG. 31, a transport apparatus 3100 includes a support frame 968, a shaft 960 whose sleeve is rigidly connected with the support frame 968, and a connector 950 joining the shaft 960 and the sleeve of another shaft 961. Another connector 951 joins the shaft 960 with a basket shaped holder 912. The holder 912 holds a transport container 911 which can contain food ingredients. The axes of the shafts 960 and 961 may be parallel to each other, although this is not a requirement. A computer controlled motor (not shown in Figure) can drive the rotation of shaft 960 around its sleeve. Another computer controlled motor (not shown in Figure) can drive the rotation of shaft 961 around its sleeve.

Figure 32:
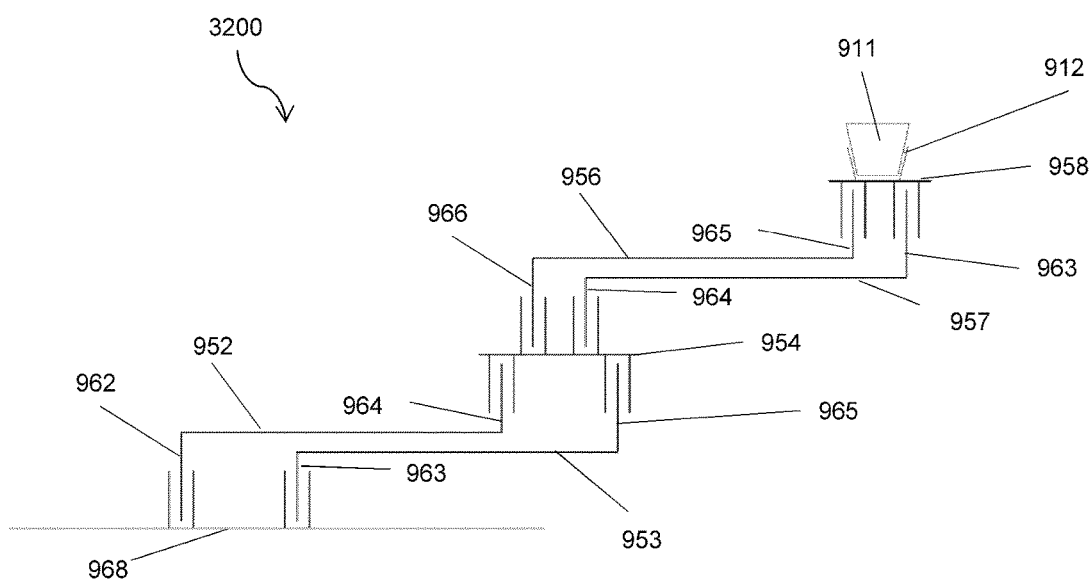

In some embodiments, referring to FIG. 32, a transport apparatus 3200 includes a support frame 968, two shafts 962 and 963 whose sleeves are both rigidly connected with the support frame 968. A connector 952 connects the shaft 962 with a shaft 964; and another connector 953 connects the shaft 963 with another shaft 965. A frame 954 rigidly joins the sleeves of the shafts 964 and 965 at the bottom, and the sleeves of another two shafts 966 and 964 at the top. A third connector 956 connects the shaft 966 with a shaft 965; and a fourth connector 964 connects the shaft 964 with a shaft 963. A frame 958 rigidly connects the sleeves of the shafts 965 and 963. A basket shaped holder 912 is mounted atop the frame 958. The holder 912 holds a transport container 911 which may contain food ingredients. The axes of the shafts 962, 963, 964, 965, 966, 964, 965 and 963 can be designed to be parallel to each other, although this is not a requirement. A computer controlled motor (not shown in Figure)

can drive the rotation of shaft 963 around its sleeve. Another computer controlled motor (not shown in Figure) can drive the rotation of shaft 966 around its sleeve.

It should be noted that the holder 912 in FIGS. 28-32 may be replaced by a holder that may hold two or more transport containers.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, the disclosed computer can store information for the food ingredients in each storage container or liquid container, including but not limited to: type, quality, grades, date of manufacture, expiration date, time and temperature required to cook them ripe, etc., etc. The disclosed computer can include input devices such as a scanner that scans pairs of tags—one tag on the storage container (or liquid container) and the other on the boxes of food ingredients, when the food ingredients are transferred from boxes of food ingredients to the storage containers (or liquid containers). The tags scanned can be tags with printed barcodes, or radio frequency identification (RFID) tags, or other types of tags.

Measures may be taken as to guarantee that the storage containers have enough food ingredients. Weighing apparatus or other devices may be used to detect if the storage containers have enough food ingredients for the next dish using the food ingredients. Red lights should be lit or alarms should be sounded if the quantity of food ingredients in a storage container is below a certain threshold, as to call for reloading the storage containers. If the automated cooking apparatus ran out of a certain food ingredients, then the computer should alert the ordering person that certain dishes that need the food ingredients may not be ordered.

Depending on the types of food ingredients therein, groups of storage containers may need to be kept at some temperature range by refrigerators. Furthermore, the storage and loading apparatus in the present application may be substituted by any dispenser of food ingredients. For the purpose of present application, food ingredients are meant to be any ingredients that may be used to cook food dishes. Food ingredients can be solid, liquid, semi-solid. Food ingredients may be raw or may require some processing (cleaning, cutting, blending, or grinding, etc.) before being transferred into the cooking container for cooking.

For the purpose of present application, the term cooking container is used to generally refer to a device for containing food ingredients during cooking. Other words such as wok, cooking pot, cooking pan, cooking ware, etc. can also be used to describe the cooking device. The cooking is also not limited to any particular ethnic styles such as stir fry, and the cooking of Asian, Mexican, Middle Eastern, or European food.

What is claimed is:

1. An automatic cooking system, comprising:
    a computer system;
    a plurality of transport containers, each configured to hold food ingredients; and
    a system comprising a plurality of stations and a plurality of mini vehicles, wherein each mini vehicle is configured to move from station to station around the plurality of stations;
    wherein each mini vehicle is configured to carry one or more transport containers of the plurality of transport containers;
    wherein the plurality of stations comprises:
        a plurality of cooking stations, each comprising:
            a cooking container configured to cook food ingredients therein to produce a cooked food; and
            an unloading apparatus comprising a motor, wherein the unloading apparatus is configured to turn a transport container of the one or more transport containers carried by a mini vehicle of the plurality of mini vehicles as to unload the food ingredients held in the transport container to the cooking container; and
        one or more storage stations, each comprising a storage container configured to hold food ingredients for storage;
    wherein the computer system is configured to control at least some of the movements of the mini vehicles;
    wherein the computer system is configured to control the motors of the unloading apparatuses of the plurality of cooking stations.

2. The automatic cooking system of claim 1, wherein the computer system is configured to control the mini vehicles using wireless communication.

3. The automatic cooking system of claim 1, wherein the number of the transport containers carried by a mini vehicle of the plurality of mini vehicles is plural, wherein the computer system is configured to control the mini vehicle to stop at a plurality of positions at a station of the plurality of stations.

4. The automatic cooking system of claim 1, further comprising sensors configured to detect positions of the plurality of mini vehicles and send signals to the computer system, wherein the computer system is configured to determine positions of the plurality of vehicles based on the signals.

5. The automatic cooking system of claim 1, further comprising one or more rail tracks configured to connect the plurality of cooking stations and the one or more storage stations, wherein the plurality of mini vehicles are configured to move along the one or more rail tracks.

6. The automatic cooking system of claim 5 wherein the number of rail tracks is plural, the system further comprising a track switch, wherein the track switch comprises:
    a frame;
    a plurality of connection tracks configured to be mounted on the said frame; and
    a movement mechanism configured to slide or rotate the said frame among a plurality of positions;
    wherein the computer system is configured to control the track switch to direct a mini vehicle of the plurality of mini vehicles to different routes along the rail tracks.

7. The automatic cooking system of claim 1, wherein a storage station of the one or more storage stations further comprises a loading apparatus configured to load food ingredients from the storage container of the storage station to a transport container of the one or more transport containers carried by a mini vehicle of the plurality of the mini vehicles, wherein the loading apparatus comprises a motor, wherein the computer system is configured to control the motor.

8. An automatic cooking system, comprising:
a computer system;
a plurality of transport containers, each configured to hold food ingredients; and
a system comprising a plurality of stations and a transport apparatus configured to move each of the plurality of transport containers from station to station around the plurality of stations;
wherein the plurality of stations comprises:
a plurality of cooking stations each comprising:
a cooking container configured to cook food ingredients therein to produce a cooked food; and
an unloading apparatus configured to turn a transport container of the plurality of transport containers as to unload food ingredients held in the transport container to the cooking container, wherein the unloading apparatus comprises a motor; and
one or more storage stations each comprising a storage container configured to hold food ingredients for storage;
wherein the computer system is configured to control the transport apparatus and the motors in the unloading apparatuses of the plurality of cooking stations.

9. The automatic cooking system of claim 8, wherein the plurality of stations comprises a cleaning station comprising:
a cart turning apparatus configured turn a transport container of the plurality of transport containers, wherein the cart turning apparatus comprises a motor; and
an apparatus configured to spray liquid on said transport container;
wherein the computer system is configured to control the motor in the cart turning apparatus;
wherein the computer system is configured to control the timing of the spraying of water.

10. The automatic cooking system of claim 8, wherein the plurality of cooking stations comprises a first cooking station configured to produce a first cooked food, wherein the plurality of cooking stations comprises a second cooking station configured to use the first cooked food as an ingredient to produce a second cooked food, wherein the first cooked food is transferred from the first cooking station to the second cooking station by a transport container of the plurality of transport containers.

11. The automatic cooking system of claim 8, wherein the unloading apparatus of a cooking station of the plurality of cooking stations comprises:
a first component; and
a support component; and
wherein the first component is configured to be rotatable relative to the support component around an axis.

12. The automatic cooking system of claim 11, wherein the unloading apparatus is configured to turn a transport container of the plurality of transport containers around the axis of rotation of the first component relative to the support component.

13. The automatic cooking system of claim 11, wherein the unloading apparatus further comprises a second component configured to be rotatable relative to the first component around an axis.

14. The automated cooking system of claim 13, wherein the unloading apparatus further comprises:
one or more hooks configured to be connected to the first component; and
one or more hooks configured to be connected to the second component;
a wheel configured to be rotatable relative to the second component;
a curved track mounted on the support component;
wherein the wheel is configured to move in the curved track;
wherein the axis of rotation of the second component relative to the first component is configured to be parallel to the axis of rotation of the first component relative to the support component.

15. The automated cooking system of claim 8, wherein the unloading apparatus of a cooking station of the plurality of cooking stations comprises:
a powered apparatus configured to grab a transport container of the plurality of transport containers;
a rotation mechanism configured to turn the powered apparatus around an axis; and
a motor configured to drive the rotation mechanism.

16. The automatic cooking system of claim 8, wherein a storage station of the one or more storage stations comprises a loading apparatus configured to load food ingredients from the storage container of the storage station to a transport container of the plurality of transport containers, wherein the loading apparatus comprises a motor, wherein the computer system is configured to control the motor.

17. The automated cooking system of claim 16, wherein the loading apparatus comprises one or more of: a tunnel, a funnel, a clipping device, a robotic arm, or a grabbing device.

18. The automatic cooking system of claim 8, further comprising a storage container and a loading apparatus comprising:
a first component mounted below the said storage container, configured to enclose a space under the storage container, wherein the space is configured to receive food ingredients from the storage container; and
a second component;
wherein the first component is configured to slide relative to the second component under the control of the computer system, wherein said sliding is configured either to adjust the volume of the enclosed space, or to transfer the food ingredients in the enclosed space to the cooking container of a cooking station of the plurality of cooking stations.

19. The automatic cooking system of claim 8, wherein the computer system is configured to track the types and quantities of the food ingredients held in the storage containers of the one or more storage stations, and the types and quantities of the food ingredients held in the plurality of transport containers.

* * * * *